(12) United States Patent
Yamamoto et al.

(10) Patent No.: US 6,212,330 B1
(45) Date of Patent: *Apr. 3, 2001

(54) INFORMATION RECORD MEDIUM, APPARATUS FOR RECORDING THE SAME AND APPARATUS FOR REPRODUCING THE SAME

(75) Inventors: Kaoru Yamamoto, Tsurugashima; Ryuichiro Yoshimura, Tokorozawa; Takao Sawabe, Tokyo-to; Yoshiaki Moriyama; Akihiro Tozaki, both of Tsurugashima; Junichi Yoshio, Tokorozawa, all of (JP)

(73) Assignee: Pioneer Electronic Corporation, Tokyo-to (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/822,457

(22) Filed: Mar. 21, 1997

(30) Foreign Application Priority Data

Mar. 22, 1996 (JP) ................................................ 8-066405

(51) Int. Cl.$^7$ .................................................... H04N 5/76
(52) U.S. Cl. ............................................. 386/95; 386/125
(58) Field of Search .................................. 386/46, 95, 125, 386/126, 52, 98; 369/32; H04N 5/76

(56) References Cited

U.S. PATENT DOCUMENTS 5,546,365 * 8/1996 Roth ........................................ 369/32
5,870,523 * 2/1999 Kikuchi et al. ........................ 386/95
5,930,450 * 7/1999 Fujita ...................................... 386/95

* cited by examiner

Primary Examiner—Huy Nguyen
(74) Attorney, Agent, or Firm—Morgan, Lewis & Bockius LLP

(57) ABSTRACT

An information recording apparatus (SS1) is provided with a signal process device (72) for applying a predetermined process to record information (R) including video information and other information to be recorded onto an information record medium (1: DVD), to thereby output processed record information (Sr) composed of a plurality of predetermined information units (30: VOBU). The signal process device also generates first recording position information for respective one of the information units. The first recording position information indicates recording positions on the information record medium of the information units corresponding to reproduction times of the record information within a predetermined range before and after the respective one of the information units. The signal process unit further generates second recording position information for respective one of the information units. The second recording position information indicates recording positions of the video information to be reproduced within the predetermined range. The information recording apparatus is also provided with: a multiplex device (75, 76) for multiplexing the processed record information, and the first and second recording position informations by each of the information units.

8 Claims, 18 Drawing Sheets

STRUCTURE OF INTERLEAVED UNIT

IU : INTERLEAVED UNIT

DSI DATA

- GENERAL INFORMATION
- SEAMLESS INFORMATION
- ANGLE JUMP DESTINATION INFORMATION
- VOB UNIT SEARCH INFORMATION
- SYNCHRONOUS REPRODUCTION INFORMATION

FIG. 7 structure of VOBU search information

| ADDRESS NUMBER | CONTENT |
|---|---|
| FWDA240 | start address of VOBU to be reproduced 120 seconds after |
| FWDA120 | start address of VOBU to be reproduced 60 seconds after |
| FWDA 60 | start address of VOBU to be reproduced 30 seconds after |
| FWDA 20 | start address of VOBU to be reproduced 10 seconds after |
| FWDA 15 | start address of VOBU to be reproduced 7.5 seconds after |
| FWDA 14 | start address of VOBU to be reproduced 7.0 seconds after |
| FWDA 13 | start address of VOBU to be reproduced 6.5 seconds after |
| FWDA 12 | start address of VOBU to be reproduced 6.0 seconds after |
| FWDA 11 | start address of VOBU to be reproduced 5.5 seconds after |
| FWDA 10 | start address of VOBU to be reproduced 5.0 seconds after |
| FWDA 9 | start address of VOBU to be reproduced 4.5 seconds after |
| FWDA 8 | start address of VOBU to be reproduced 4.0 seconds after |
| FWDA 7 | start address of VOBU to be reproduced 3.5 seconds after |
| FWDA 6 | start address of VOBU to be reproduced 3.0 seconds after |
| FWDA 5 | start address of VOBU to be reproduced 2.5 seconds after |
| FWDA 4 | start address of VOBU to be reproduced 2.0 seconds after |
| FWDA 3 | start address of VOBU to be reproduced 1.5 seconds after |
| FWDA 2 | start address of VOBU to be reproduced 1.0 second after |
| FWDA 1 | start address of VOBU to be reproduced 0.5 seconds after |
| BWDA 1 | start address of VOBU reproduced 0.5 seconds before |
| BWDA 2 | start address of VOBU reproduced 1.0 second before |
| BWDA 3 | start address of VOBU reproduced 1.5 seconds before |
| BWDA 4 | start address of VOBU reproduced 2.0 seconds before |
| BWDA 5 | start address of VOBU reproduced 2.5 seconds before |
| ⋮ | ⋮ |

FIG. 9
VOBU search information

Example 1

| ADDRESS NUMBER | PREDETERMINED TIME | VOBU ADDRESS A | VOBU ADDRESS B | TOTAL NUMBER OF BYTES |
|---|---|---|---|---|
| FWDA 240 | 120 seconds after | ... | ... | 8 |
| FWDA 120 | 60 seconds after | ... | ... | 8 |
| FWDA 60 | 30 seconds after | ... | ... | 8 |
| FWDA 20 | 10 seconds after | ... | 34 | 8 |
| FWDA 15 | 7.5 seconds after | 27 | 27 | 8 |
| FWDA 14 | 7.0 seconds after | 21 | 21 | 8 |
| FWDA 13 | 6.5 seconds after | 20 | 14 | 8 |
| FWDA 12 | 6.0 seconds after | 20 | 14 | 8 |
| FWDA 11 | 5.5 seconds after | 19 | 14 | 8 |
| FWDA 10 | 5.0 seconds after | 19 | 14 | 8 |
| FWDA 9 | 4.5 seconds after | 18 | 14 | 8 |
| FWDA 8 | 4.0 seconds after | 18 | 14 | 8 |
| FWDA 7 | 3.5 seconds after | 14 | 14 | 8 |
| FWDA 6 | 3.0 seconds after | 14 | 14 | 8 |
| FWDA 5 | 2.5 seconds after | 13 | 5 | 8 |
| FWDA 4 | 2.0 seconds after | 13 | 5 | 8 |
| FWDA 3 | 1.5 seconds after | 12 | 5 | 8 |
| FWDA 2 | 1.0 second after | 12 | 5 | 8 |
| FWDA 1 | 0.5 seconds after | 5 | 1 | 8 |
| BWDA 1 | 0.5 seconds before | ... | ... | 8 |
| BWDA 2 | 1.0 second before | ... | ... | 8 |
| BWDA 3 | 1.5 seconds before | ... | ... | 8 |
| BWDA 4 | 2.0 seconds before | ... | ... | 8 |
| BWDA 5 | 2.5 seconds before | ... | ... | 8 |
| ⋮ | ⋮ | ⋮ | ⋮ | ⋮ |

FIG. 10
VOBU search information

Example 2

| ADDRESS NUMBER | PREDETERMINED TIME | VOBU ADDRESS A | PRESENCE Information A | PRESENCE Information B | TOTAL NUMBER OF BYTES |
|---|---|---|---|---|---|
| FWDA240 | 120 seconds after | ... | ... | ... | 4 |
| FWDA120 | 60 seconds after | ... | ... | ... | 4 |
| FWDA 60 | 30 seconds after | ... | ... | ... | 4 |
| FWDA 20 | 10 seconds after | ... | ... | ... | 4 |
| FWDA 15 | 7.5 seconds after | 27 | 1 | 0 | 4 |
| FWDA 14 | 7.0 seconds after | 21 | 1 | 0 | 4 |
| FWDA 13 | 6.5 seconds after | 20 | 0 | 0 | 4 |
| FWDA 12 | 6.0 seconds after | 20 | 0 | 0 | 4 |
| FWDA 11 | 5.5 seconds after | 19 | 0 | 0 | 4 |
| FWDA 10 | 5.0 seconds after | 19 | 0 | 0 | 4 |
| FWDA 9 | 4.5 seconds after | 18 | 0 | 0 | 4 |
| FWDA 8 | 4.0 seconds after | 18 | 0 | 0 | 4 |
| FWDA 7 | 3.5 seconds after | 14 | 1 | 0 | 4 |
| FWDA 6 | 3.0 seconds after | 14 | 1 | 0 | 4 |
| FWDA 5 | 2.5 seconds after | 13 | 0 | 0 | 4 |
| FWDA 4 | 2.0 seconds after | 13 | 0 | 0 | 4 |
| FWDA 3 | 1.5 seconds after | 12 | 0 | 0 | 4 |
| FWDA 2 | 1.0 second after | 12 | 0 | 0 | 4 |
| FWDA 1 | 0.5 seconds after | 5 | 1 | 0 | 4 |
| BWDA 1 | 0.5 seconds before | ... | ... | ... | 4 |
| BWDA 2 | 1.0 second before | ... | ... | ... | 4 |
| BWDA 3 | 1.5 seconds before | ... | ... | ... | 4 |
| BWDA 4 | 2.0 seconds before | ... | ... | ... | 4 |
| BWDA 5 | 2.5 seconds before | ... | ... | ... | 4 |
| : | : | : | : | : | : |

(1: present, 0: absent)

TIMES SEARCH OPERATION (1)

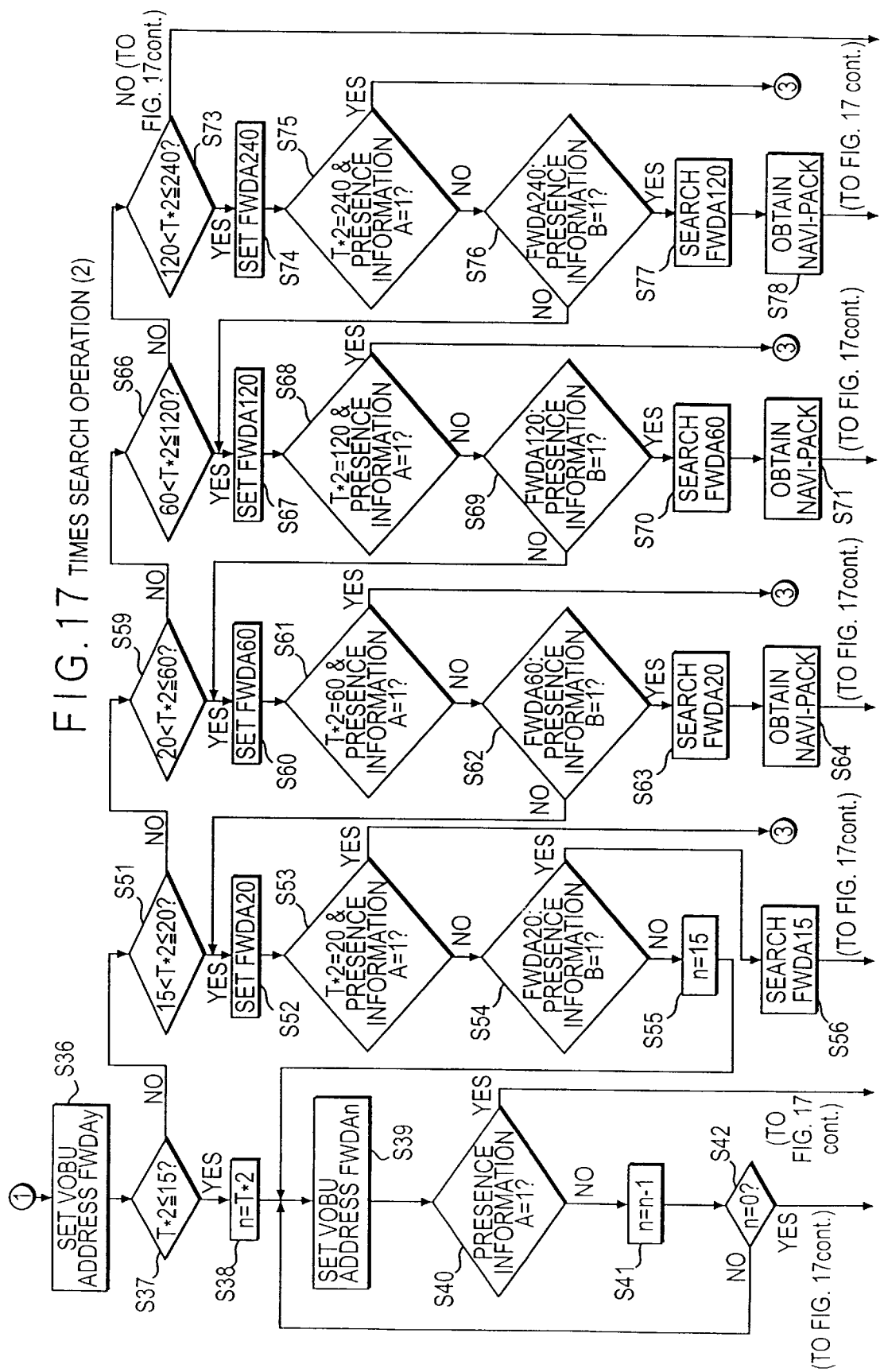
FIG. 17 TIMES SEARCH OPERATION (2)

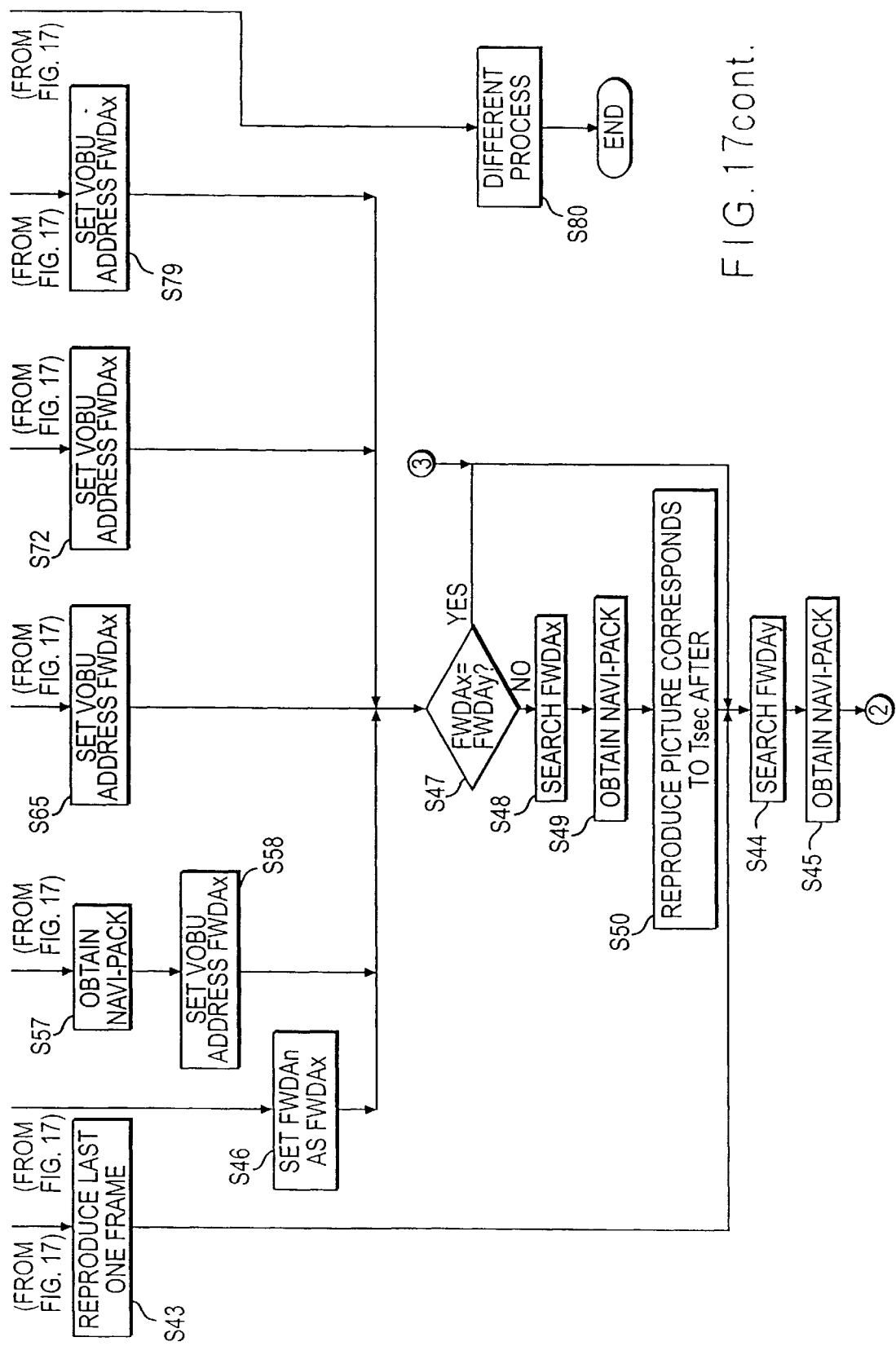
FIG. 17cont.

INFORMATION RECORD MEDIUM, APPARATUS FOR RECORDING THE SAME AND APPARATUS FOR REPRODUCING THE SAME

BACKGROUND OF THE INVENTION

1. Field of the Invention

The present invention relates to an information record medium such as an optical disk of a high recording density type, which is capable of recording information such as video information, audio information and the like at a high density, and which is represented by a DVD (Digital Video or Versatile Disk). The present invention also relates to a recording apparatus for recording the information onto the information record medium, and a reproducing apparatus for reproducing the information from the information record medium.

2. Description of the Related Art

Conventionally, a so-called LD (Laser Disk) and a so-called CD (Compact Disk) are generalized as optical disks, on which information such as video information, audio information and the like is recorded.

On the LD or the like, the video information and the audio information are recorded together with time information indicating a time at which each information is to be reproduced with respect to a reproduction start position, which each LD or the like has, as a standard position. Thus, other than a general normal reproduction to reproduce the recorded information in the order of recording, various special reproductions are possible, such as a reproduction to extract and listen to an only desirable music out of a plurality of recorded musics, a reproduction to listen to the recorded musics in a random order and so on, in case of the CD, for example.

However, with the conventional LD mentioned above, video image or audio sound cannot be reproduced in such an interactive and variegated manner that gives the audience several options in selecting video image to be displayed or audio sound to be played back.

For example, when watching a foreign movie recorded in an LD, the audience cannot select preferable language for the title credit (subscript) displayed on the screen (e.g., select either Japanese language or the original language). Similarly, when listening to the music in a CD, the audience cannot select a preferable version out of multiple versions of the same music piece (e.g., English lyrics or Japanese lyrics).

Further, it is very difficult to store different editing versions of one movie (e.g., an original version, a theater version, a video version, etc.) on one LD or the like, because even common portions must be recorded double or more for each of these versions. Thus, under the current technique, it is practically necessary to store only one of these versions on respective one of the different disks. Accordingly, the audience cannot select one of the different versions of the same movie from one disk.

Furthermore, since it is also impossible to record multiple versions of a scene taken from different camera angles simultaneously in one movie film, the audience cannot select an image of a preferable camera angle among different camera angles. Thus, fun and enjoyment of the audience is limited in this respect.

The conventional LD or the like cannot treat both of a moving picture and a still picture simultaneously in the same scheme. For example, with a slide show composed of still pictures and associated audio sounds, it is impossible for the audience to search only the still picture corresponding to an arbitrary reproduction time.

Meanwhile, various proposals and developments as for the DVD, which is an optical disk having a memory capacity about ten times as much as that of the conventional CD without changing the size of the optical disk itself, are energetically being made nowadays. However, in case of recording onto the DVD the record information which can offer the multiple options to the audience in the aforementioned manner and which can reproduce the selected content of the record information correctly, reliably and promptly, various control informations must be recorded besides the various types of video information and audio information to be reproduced.

However, there is a problem in this case that the video image may break or may be interrupted, or the relation between the video image and the associated audio sound may be destroyed during the scanning reproduction due to the complicated relationships among the video and audio informations, and the control information for controlling these informations.

SUMMARY OF THE INVENTION

It is therefore an object of the present invention to provide: an information recording apparatus for recording information so that the record information can be precisely and smoothly reproduced from an information record medium capable of variegated reproductions in response to various reproduction modes including the scanning reproduction; an information record medium recorded by this information recording apparatus; and an information reproducing apparatus for reproducing the record information from this information record medium.

The above object of the present invention can be achieved by a first information recording apparatus provided with: a signal process device for (i) applying a predetermined process, such as the process based on the MPEG 2 method etc., to record information including video information and other information to be recorded onto an information record medium such as the DVD etc., to thereby output processed record information composed of a plurality of predetermined information units such as VOB (Video OBject) units (described later) etc., (ii) generating and outputting a first recording position information, such as a VOB unit address A etc., for respective one of the information units on the basis of control information to control a reproduction of said record information inputted from the external, the first recording position information being to be multiplexed to the processed record information by respective one of the information units and indicating recording positions on the information record medium of the information units corresponding to reproduction times of the record information within a predetermined range before and after the respective one of the information units on an axis of reproduction time of the record information, and (iii) generating and outputting second recording position information, such as a VOB unit address B etc., for respective one of the information units, the second recording position information being to be multiplexed together with the first recording position information to the processed record information by respective one of the information units, corresponding to the first recording position information and indicating recording positions of the video information to be reproduced within the predetermined range on the axis of reproduction time; a multiplex device for multiplexing the processed record information, the first recording position information and the second recording position information to each other by each of the information units, to thereby output multiplexed record information; and a record device, such as a mastering device etc., for recording the multiplexed record information onto the information record medium.

According to the first information recording apparatus of the present invention, the predetermined process is applied to the record information, so that the processed record information is outputted by the signal process device. On the basis of the control information, the first recording position information is generated and outputted for respective one of the information units, and the second recording position information is also generated and outputted for respective one of the information units, by the signal process device. Then, the processed record information, the first recording position information and the second recording position information are multiplexed to each other by each of the information units, so that the multiplexed record information is outputted by the multiplex device. Finally, the multiplexed record information is recorded onto the information record medium, by the record device.

Thus, at the time of reproducing the record information, by performing the reproduction on the basis of the first and second recording position informations, the video information to be reproduced can be promptly searched and reproduced.

Accordingly, in case of a variegated reproduction of the record information, the record information can be reproduced while accurately and smoothly reproducing the video information.

In one aspect of the first information recording apparatus of the present invention, the video information comprises information corresponding to a moving picture at a time of the reproduction and information corresponding to a still picture at the time of the reproduction. And that, the signal process device generates and outputs the second recording position information, which indicates the recording positions of the information corresponding to the moving picture or the recording positions of the information corresponding to the still picture.

According to this aspect, since the video information comprises the video informations corresponding to the moving picture and the still picture respectively and since the second recording position information indicates the recording positions of these video informations respectively, at the time of reproducing the record information, even in a case where the still pictures are continued, the moving picture or the still picture to be nextly reproduced can be promptly searched and reproduced.

Accordingly, in case of a variegated reproduction of the record information, the record information can be reproduced while accurately and smoothly reproducing the still picture or the moving picture.

The above object of the present invention can be also achieved by a second information recording apparatus provided with: a signal process device for (i) applying a predetermined process, such as a process based on the MPEG 2 method etc., to record information including video information and other information to be recorded onto an information record medium such as the DVD etc., to thereby output processed record information composed of a plurality of predetermined information units such as VOB units etc., (ii) generating and outputting a recording position information, such as a VOB unit address etc., for respective one of the information units on the basis of control information to control a reproduction of said record information inputted from the external, the recording position information being to be multiplexed to the processed record information by respective one of the information units and indicating recording positions on the information record medium of the information units corresponding to reproduction times of the record information within a predetermined range before and after the respective one of the information units on an axis of reproduction time of the record information, and (iii) generating and outputting video presence information for respective one of the information units, the video presence information being to be multiplexed together with the recording position information to the processed record information by respective one of the information units, corresponding to the recording position information and indicating presence or absence of the video information at each of the information units whose recording positions are indicated by the record position information; a multiplex device for multiplexing the processed record information, the recording position information and the video presence information to each other by each of the information units, to thereby output multiplexed record information; and a record device for recording the multiplexed record information onto the information record medium.

According to the second information recording apparatus of the present invention, the predetermined process is applied to the record information, so that the processed record information is outputted by the signal process device. On the basis of the control information, the recording position information is generated and outputted for respective one of the information units, and the video presence information is also generated and outputted for respective one of the information units, by the signal process device. Then, the processed record information, the recording position information and the video presence information are multiplexed to each other by each of the information units, so that the multiplexed record information is outputted by the multiplex device. Finally, the multiplexed record information is recorded onto the information record medium, by the record device.

Thus, at the time of reproducing the record information, by performing the reproduction on the basis of the recording position information and the video presence information, the video information to be reproduced can be promptly searched and reproduced. Further, if the video information is not included in an information unit, it is possible to reproduce the video information without searching this information unit in which the video information is not recorded, so that the reproduction of the video information can be performed without breaking or interrupting it.

Accordingly, in case of a variegated reproduction of the record information, the record information can be reproduced while accurately and smoothly reproducing the video information.

In one aspect of the second information recording apparatus of the present invention, the video information comprises information corresponding to a moving picture at a time of the reproduction and information corresponding to a still picture at the time of the reproduction. And that, the signal process device generates and outputs the video presence information, which indicates the presence or absence of the information corresponding to the moving picture or the presence or absence of the information corresponding to the still picture.

According to this aspect, since the video information comprises the video informations corresponding to the moving picture and the still picture respectively and since the video presence information indicates the presence or absence of the video informations corresponding to the moving picture or the still picture respectively, at the time of reproducing the record information, even in a case where the still pictures are continued, the moving picture or the still picture to be nextly reproduced can be promptly searched and reproduced. Further, if the moving picture or the still picture is not included in an information unit, it is possible to reproduce the video information without searching this information unit in which the moving picture or the still picture is not recorded, so that the reproduction of the video information can be performed without breaking or interrupting it.

Accordingly, in case of a variegated reproduction of the record information, the record information can be reproduced while accurately and smoothly reproducing the still picture or the moving picture.

The above object of the present invention can be also achieved by a first information record medium, such as the DVD etc., recorded with record information to be reproduced by an information reproducing apparatus for performing a reproduction of the record information on the basis of recording position information, which indicates recording positions of the record information and which is recorded on the information record medium besides the record information. The first information record medium comprises a data structure stored in the information record medium and including: processed record information, which is generated by applying a predetermined signal process, such as a process based on the MPEG 2 method etc., to the record information including video information and other information to be recorded, and which is composed of a plurality of predetermined information units such as VOB units etc. first recording position information such as a VOB unit address A etc., which indicates recording positions on the information record medium of the information units corresponding to reproduction times of the record information within a predetermined range before and after the respective one of the information units on an axis of reproduction time of the record information; and second recording position information such as a VOB unit address B etc., which corresponds to the first recording position information and indicates recording positions of the video information to be reproduced within the predetermined range on the axis of reproduction time, the processed record information, the first recording position information and the second recording position information being multiplexed by respective one of the information units.

According to the first information record medium of the present invention, it has such a structure that the processed record information, the first recording position information and the second recording position information are multiplexed by inserting the first and second recording position informations into the processed record information for respective one of information units. Thus, at the time of reproducing the record information, by performing the reproduction on the basis of the first and second recording position informations, the video information to be reproduced can be promptly searched and reproduced.

Accordingly, in case of a variegated reproduction of the record information, the record information can be reproduced while accurately and smoothly reproducing the video information.

In one aspect of the first information record medium of the present invention, the video information comprises information corresponding to a moving picture at a time of the reproduction and information corresponding to a still picture at the time of the reproduction. And that, the second recording position information indicates the recording positions of the information corresponding to the moving picture or the recording positions of the information corresponding to the still picture.

According to this aspect, since the video information comprises the video informations corresponding to the moving picture and the still picture respectively and since the second recording position information indicates the recording positions of these video informations respectively, at the time of reproducing the record information, even in a case where the still pictures are continued, the moving picture or the still picture to be nextly reproduced can be promptly searched and reproduced.

Accordingly, in case of a variegated reproduction of the record information, the record information can be reproduced while accurately and smoothly reproducing the still picture or the moving picture.

The above object of the present invention can be also achieved by a second information record medium, such as the DVD etc., recorded with record information to be reproduced by an information reproducing apparatus for performing a reproduction of the record information on the basis of recording position information, which indicates recording positions of the record information and which is recorded on the information record medium besides the record information. The second information record medium comprises a data structure stored in the information record medium and including: processed record information, which is generated by applying a predetermined signal process, such as a process based on the MPEG 2 method etc., to the record information including video information and other information to be recorded, and which is composed of a plurality of predetermined information units such as VOB units etc. recording position information such as a VOB unit address A etc., which indicates recording positions on the information record medium of the information units corresponding to reproduction times of the record information within a predetermined range before and after the respective one of the information units on an axis of reproduction time of the record information; and video presence information, which corresponds to the recording position information and indicates presence or absence of the video information at each of the information units whose recording positions are indicated by the record position information, the processed record information, the recording position information and the video presence information being multiplexed by respective one of the information units.

According to the second information record medium of the present invention, it has such a structure that the processed record information, the recording position information and the video presence information are multiplexed by inserting the recording position information and the video presence information into the processed record information for respective one of information units. Thus, at the time of reproducing the record information, by performing the reproduction on the basis of the recording position information and the video presence information, the video information to be reproduced can be promptly searched and reproduced. Further, if the video information is not included in an information unit, it is possible to reproduce the video information without searching this information unit in which the video information is not recorded, so that the reproduction of the video information can be performed without breaking or interrupting it.

Accordingly, in case of a variegated reproduction of the record information, the record information can be reproduced while accurately and smoothly reproducing the video information.

In one aspect of the second information record medium of the present invention, the video information comprises information corresponding to a moving picture at a time of the reproduction and information corresponding to a still picture at the time of the reproduction. And that, the video presence information indicates the presence or absence of the information corresponding to the moving picture or the presence or absence of the information corresponding to the still picture.

According to this aspect, since the video information comprises the video informations corresponding to the moving picture and the still picture respectively and since the video presence information indicates the presence or absence of the video informations corresponding to the moving picture or the still picture respectively, at the time of reproducing the record information, even in a case where the still pictures are continued, the moving picture or the still picture to be nextly reproduced can be promptly searched and reproduced. Further, if the moving picture or the still picture is not included in an information unit, it is possible to reproduce the video information without searching this information unit in which the moving picture or the still picture is not recorded, so that the reproduction of the video information can be performed without breaking or interrupting it.

Accordingly, in case of a variegated reproduction of the record information, the record information can be reproduced while accurately and smoothly reproducing the still picture or the moving picture.

The above object of the present invention can be also achieved by a first information reproducing apparatus for reproducing record information from the above described first information record medium of the present invention. The first information reproducing apparatus is provided with: a detection and demodulation device, such as an optical pickup, a demodulation and correction unit etc., for detecting and demodulating the processed record information, the first recording position information and the second recording position information from the first information record medium on the basis of a control signal, to thereby output a demodulation signal; an extract device, such as a system buffer etc., for extracting the first recording position information and the second recording position information out of the demodulation signal; and a control device, such as a system controller etc., for outputting the control signal on the basis of the extracted first recording position information and the extracted second recording position information.

According to the first information reproducing apparatus of the present invention, the processed record information, the first recording position information and the second recording position information are detected and demodulated from the first information record medium on the basis of the control signal, so that the demodulation signal is outputted, by the detection and demodulation device. Then, the first recording position information and the second recording position information are extracted out of the demodulation signal, by the extract device. Then, the control signal is outputted on the basis of the extracted first recording position information and the extracted second recording position information, by the control device. Thus, by reproducing the record information on the basis of the first recording position information, which indicates the recording position of the information unit to be reproduced, and the second recording position information, which indicates the recording position of the video information to be reproduced, it is possible to promptly search and reproduce the video information to be reproduced.

Accordingly, in case of a variegated reproduction of the record information, the record information can be reproduced while accurately and smoothly reproducing the video information.

In one aspect of the first information reproducing apparatus of the present invention, the video information comprises information corresponding to a moving picture at a time of the reproduction and information corresponding to a still picture at the time of the reproduction. And that, the detection and demodulation device detects and demodulates the second recording position information, which indicates the recording positions of the information corresponding to the moving picture or the recording positions of the information corresponding to the still picture.

According to this aspect, since the video information comprises the video informations corresponding to the moving picture and the still picture respectively and since the second recording position information indicates the recording positions of these video informations respectively, even in a case where the still pictures are continued, the moving picture or the still picture to be nextly reproduced can be promptly searched and reproduced.

Accordingly, in case of a variegated reproduction of the record information, the record information can be reproduced while accurately and smoothly reproducing the still picture or the moving picture.

The above object of the present invention can be also achieved by a second information reproducing apparatus for reproducing record information from the above described second information record medium. The second information reproducing apparatus is provided with: a detection and demodulation device for detecting and demodulating the processed record information, the recording position information and the video presence information from the information record medium on the basis of a control signal, to thereby output a demodulation signal; an extract device for extracting the recording position information and the video presence information out of the demodulation signal; and a control device for outputting the control signal on the basis of the extracted recording position information and the extracted video presence information.

According to the second information reproducing apparatus of the present invention, the processed record information, the recording position information and the video presence information are detected and demodulated from the second information record medium on the basis of the control signal, so that the demodulation signal is outputted, by the detection and demodulation device. Then, the recording position information and the video presence information are extracted out of the demodulation signal, by the extract device. Then, the control signal is outputted on the basis of the extracted recording position information and the extracted video presence information, by the control device. Thus, by reproducing the record information on the basis of the recording position information, which indicates the recording position of the information unit to be reproduced, and the video presence information, which indicates the presence or absence of the video information in the information unit to be reproduced, it is possible to promptly search and reproduce the video information to be reproduced. Further, if the video information is not included in an information unit, it is possible to reproduce the video information without searching this information unit in which the video information is not recorded, so that the reproduction of the video information can be performed without breaking or interrupting it.

Accordingly, in case of a variegated reproduction of the record information, the record information can be reproduced while accurately and smoothly reproducing the video information.

In one aspect of the second information reproducing apparatus of the present invention, the video information comprises information corresponding to a moving picture at a time of the reproduction and information corresponding to a still picture at the time of the reproduction. And that, the detection and demodulation device detects and demodulates the video presence information, which indicates the presence or absence of the information corresponding to the moving picture or the presence or absence of the information corresponding to the still picture.

According to this aspect, since the video information comprises the video informations corresponding to the moving picture and the still picture respectively and since the video presence information indicates the presence or absence of the video informations corresponding to the moving picture or the still picture respectively, even in a case where the still pictures are continued, the moving picture or the still picture to be nextly reproduced can be promptly searched and reproduced. Further, if the moving picture or the still picture is not included in an information unit, it is possible to reproduce the video information without searching this information unit in which the moving picture or the still picture is not recorded, so that the reproduction of the video information can be performed without breaking or interrupting it.

Accordingly, in case of a variegated reproduction of the record information, the record information can be reproduced while accurately and smoothly reproducing the still picture or the moving picture.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 5 is a diagram for explaining the information contained in DSI data;

FIG. 7 is a diagram showing a structure of the VOB unit search information;

FIG. 9 is a diagram showing one example of VOB unit search information in the embodiment;

FIG. 10 is a diagram showing another example of the VOB unit search information in the embodiment;

FIG. 17 is a flowchart (2) showing the time search operation according to the embodiment.

DETAILED DESCRIPTION OF THE PREFERRED EMBODIMENTS

Referring to the accompanying drawings, embodiments of the present invention will be now explained. The following explanations will be done for the embodiments, in which the present invention is applied to the aforementioned DVD.

In the following embodiments, constitutional elements listed on a right hand side in a following list respectively construct examples of constitutional elements of the present invention listed on a left hand side in the following list.

| | |
|---|---|
| information unit | : VOBU (VOB(Video OBject)-Unit) |
| first recording position information, and recording position information | : VOB unit address A |
| second recording position information | : VOB unit address B |
| video presence information | : presence information |

(I) Embodiment of Information Record Medium

First of all, a physical structure and a logical structure as well as an operation of a DVD, as one embodiment of the information record medium to which the present invention is applied, will be explained with reference to FIGS. 1 to 10.

Figure 1:
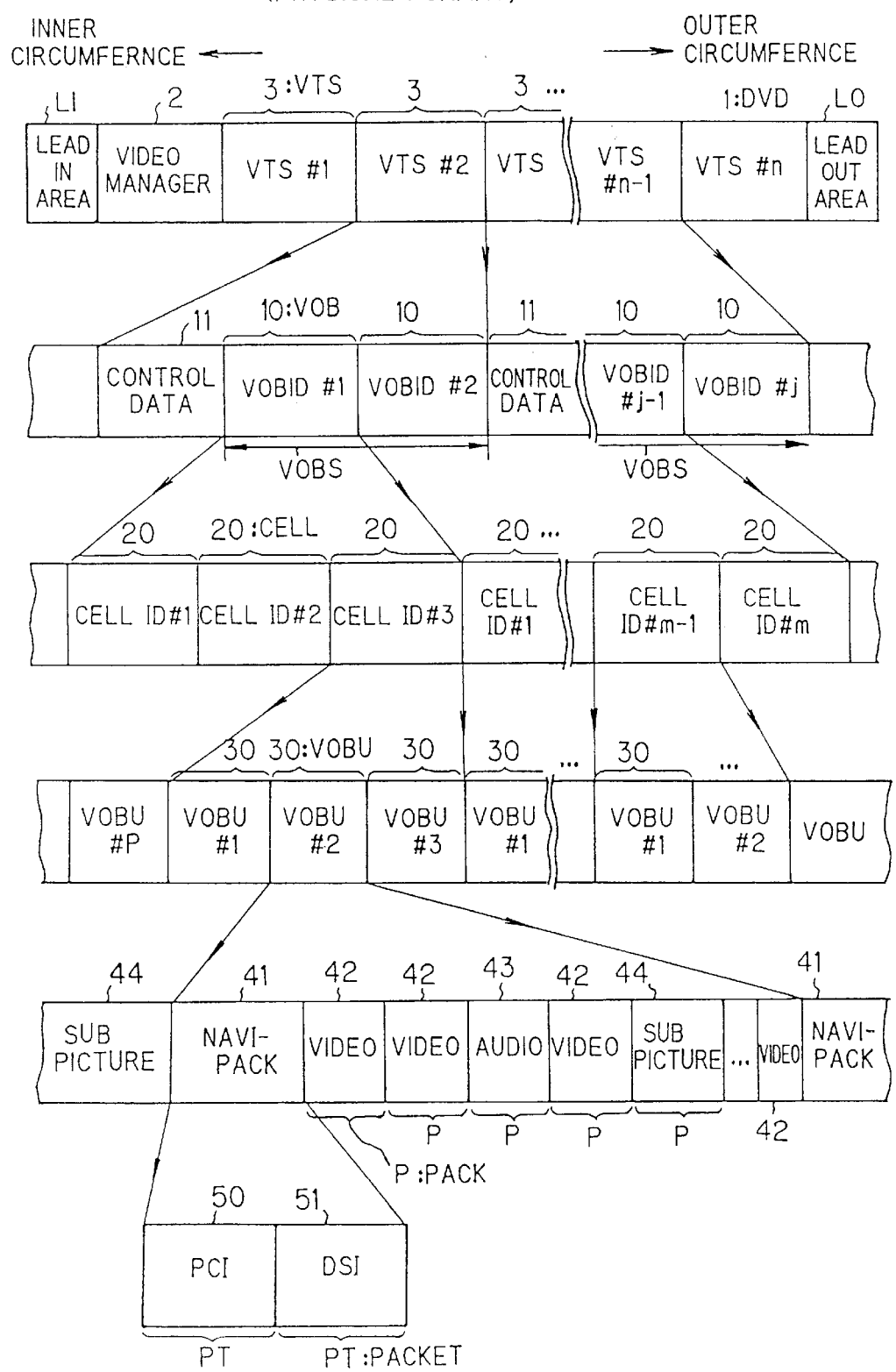
FIG. 1 is a diagram showing a physical structure of record information of a DVD as one embodiment of the present invention.

At first, a record format of video information and audio information on the DVD (i.e. a physical record format) is explained by use of FIG. 1.

As shown in FIG. 1, a DVD 1 as the present embodiment is provided with a lead in area LI at its most inner circumferential portion and a lead out area LO at its most outer circumferential portion, between which video information (e.g. information indicative of a moving picture and information indicative of a still picture at the time of reproduction) and audio information are recorded such that they are divided into a plurality of VTSs 3, each of which has a unique ID (Identification) number (i.e. VTS#1 to VTS#n). Here, the VTS (Video Title Set) 3 is a set (bundle) of titles (each of which is one production or one work which an author or producer intends to offer to the audience), which are related to each other (e.g., which attribute, such as the number, the specification, the corresponding languages etc. of the audio information and sub picture information included therein, is the same to each other). More concretely, a plurality of movies which are related to the same movie to each other but which languages of serifs (lines) are different from each other may be recorded as different titles respectively, or even in case of the same movies, the theater version and the special version may be recorded as different titles respectively. Ahead of the area where the VTSs 3 are recorded, a video manager 2 is recorded as shown in FIG. 1. As the information recorded in the video manager 2, for example, information related to the whole video and audio information recorded on the DVD 1, such as a menu for showing a name of each title, information for preventing an illegal copy, an access table for accessing each title and so on, is recorded.

One VTS 3 is recorded such that it is divided into a plurality of VOBs 10, each of which has an ID number (VOB ID#1, VOB ID#2, . . . ), and control data 11 disposed ahead of the VOBs 10. Here, a data portion constructed by a plurality of VOBs 10 is defined as a VOB set (VOBS) as shown in FIG. 1. This VOB set is defined to distinguish the VOB 10, which constructs one portion of the VTS 3 as the substantial portion of the video and audio information, from the control data 11, which constructs another portion of the VTS 3.

In the control data 11 recorded at the head of the VTS 3, information such as PGCI (ProGram Chain Information), which is various information related to a program chain as a logical division obtained by combining a plurality of cells (the "cell" will be described later in detail), is recorded. In each VOB 10, the substantial portion of the video and audio information (i.e. the video and audio information itself other than control information) besides the control information are recorded.

Further, one VOB 10 is constructed of a plurality of cells 20, each of which has an ID number (cell ID#1 , cell ID#2, . . . ). Here, one VOB 10 is constructed such that it is completed by the plurality of cells 20 and that one cell 20 does not strides over two VOBs 10.

Nextly, one cell 20 is constructed of a plurality of VOB units (VOBUs) 30, each of which has an ID number (VOBU#1, VOBU#2, . . . ). Here, the VOB unit 30 is an information unit, each of which includes at least one of the video information, the audio information and sub picture information (which is defined as information of a sub picture such as a subtitle of a movie etc.), or each of which includes only a navi(navigation)-pack described later.

One VOB unit 30 is provided with: a navi-pack (a navigation pack) 41 for storing control information to control the video information etc. included in the pertinent VOB unit 30, as a control object; a video data 42 as the video information; an audio data 43 as the audio information; and a sub picture data 44 as the sub picture information. Here, in a pack P for the video data 42, only the video data is recorded. In a pack P for the audio data 43, only the audio data is recorded. Further, in a pack P for the sub picture data 44, only graphic data of a character, a diagram or the like as the sub picture, is recorded.

It is prescribed by a standard specification of the DVD that there are 8 kinds of audio recordable on the DVD 1 while 32 kinds of sub picture recordable on the DVD 1.

These data are recorded such that the reproduction time corresponding to one VOB unit 30 (i.e. the reproduction time corresponding to the data recorded between one navi-pack 41 and another navi-pack 41 adjacent to said one navi-pack 41) is not shorter than 0.4 seconds.

Further, there always exists the navi-pack 41 in one VOBU 30 at the head thereof. On the other hand, there may not exist each of the video data 42, the audio data 43 and the sub picture data 44 in one VOBU 30, or, even in case that the packs P for these data exist in one VOBU 30, the number of the packs P and the order of the packs P are freely determined.

Here, a division of each of the video data 42, the audio data 43 and the sub picture data 44 as shown in FIG. 1, is called as a pack P. Namely, in one VOB unit 30, the video data 42, the audio data 43 and the sub picture data 44 are divided into packs P respectively and recorded, wherein the pack P in which the video data 42 is recorded is called as a video pack, the pack P in which the audio data 43 is recorded is called as an audio pack, and the pack P in which the sub picture data 44 is recorded is called as a sub picture pack. These packs P are record units set in correspondence with a packing process in the MPEG 2 method, which is employed at the time of recording the record information onto the DVD 1 in the present embodiment.

Further, a reading start time information, which is called as a SCR (System Clock Reference), a start code indicating a start of the pack P and the like are recorded at a pack header recorded at the head of each pack P. This SCR indicates a reading start time on a time axis of reproduction time, at which reading the data included in each pack P from the track buffer in the reproducing apparatus described later and inputting the read data into each buffer are to be started. On the other hand, as for each pack P, the video data 42, the audio data 43 or the sub picture data 44 is recorded in each packet, which is generally a record unit obtained by dividing the pack P more finely. In the DVD 1 of the present embodiment, one pack P consists of one packet PT in general.

Finally, the navi-pack 41 is provided with: a DSI (Data Search Information) data 51 in a packet PT including search information to search a video image or an audio sound desired to be displayed or sound-outputted (concretely, search information such as an address, where the video or audio to be displayed or sound-outputted is recorded, on the DVD 1); and a PCI (Presentation Control Information) data 50 in a packet PT including information related to a display control at a time of displaying the video image or outputting the audio sound, which is searched on the basis of the information of the DSI data 51. Here, the DSI data 51 and the PCI data 50 construct, as the packets, a DSI packet and a PCI packet respectively, and then are recorded. Further, all video data 42 included in one VOBU 30 consist of at least one GOP (Group Of Pictures) each having an ID number.

In the PCI data 50, high light information, which defines a display or operation at a time when one selection item is selected out of selection items by the audience, is included. By the high light information, for example, the change of the picture plane display for a selection item as well as the display position to be changed in correspondence with the selection item, on a special picture plane of selection items (i.e. a so-called menu picture plane) for the audience to select, and the command corresponding to the selected item (i.e. a command to be performed in correspondence with the selected item) are set.

Further, the video information to construct and display a frame, a selection button and the like, which is required to construct and display the menu picture plane, is recorded in the sub picture data 44 as the sub picture information.

Information to set a value of a register (memory) in a system controller of a reproducing apparatus described later may be included in the high light information. This point is explained by use of a case where the record information recorded on the DVD 1 is an educational software, for example. Namely, in case of an educational software, there may be a case where a test question is displayed on a display portion, and then, a plurality of answer candidates may be displayed as selection items for the audience to select, by use of the sub picture data 44. At this time, if the selection item corresponding to the correct answer for the pertinent question is selected by the audience, the system controller adds a predetermined point or score corresponding to the correct answer to a value of the predetermined register included in the system controller, by use of the command information corresponding to the selection items respectively in the high light information, while the system controller does not add the point or score if the selection item corresponding to the incorrect answer is selected. After that, making question and answering are repeated for a predetermined number of questions in the same manner. After finishing all of the answers, the system controller refers to the predetermined register to which the points or scores are accumulated, and, according to other command information (e.g. the command in the PGCI), controls the optical pickup to jump to a record position on the DVD 1 where questions etc. at a next study stage are recorded if the value of the total points is larger than a predetermined value which is set in advance, while controls the optical pickup to jump to a record position where a software for reviewing is recorded if the value of the total points is less than the predetermined value. As in the above explained example, it is possible to set the value of the register in the controller by the high light information.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

On the other hand, the above described GOP is a minimum picture unit, which can be independently reproduced and which is determined by a standard based on the MPEG (Moving Picture Experts Group) 2 method. The MPEG 2 method is a picture compression method adopted at a time of recording the video information onto the DVD 1 in the present embodiment.

Here, the outline of the MPEG 2 method is explained. Namely, in general, frame pictures forward and backward of one frame picture in continuous frame pictures are often resembled to each other and have mutual relationships. The MPEG 2 method is a method, which is proposed by paying an attention to this fact, and which generates one frame picture existing between a plurality of frame pictures on the basis of the plurality of frame pictures transferred while they are timely separated by a few or several frames from each other, by means of an interpolating calculation based on moving vectors etc. of the original picture. In this case, if this one frame picture is to be recorded, it is enough to just record the information as for a differential vector and a moving vector thereof with respect to the plurality of frame pictures, so as to reproduce this one frame picture by estimating it from the plurality of frame pictures with referring to these vectors, at a time of reproduction. By this, the compression recording is enabled with respect to the picture.

Figure 2:
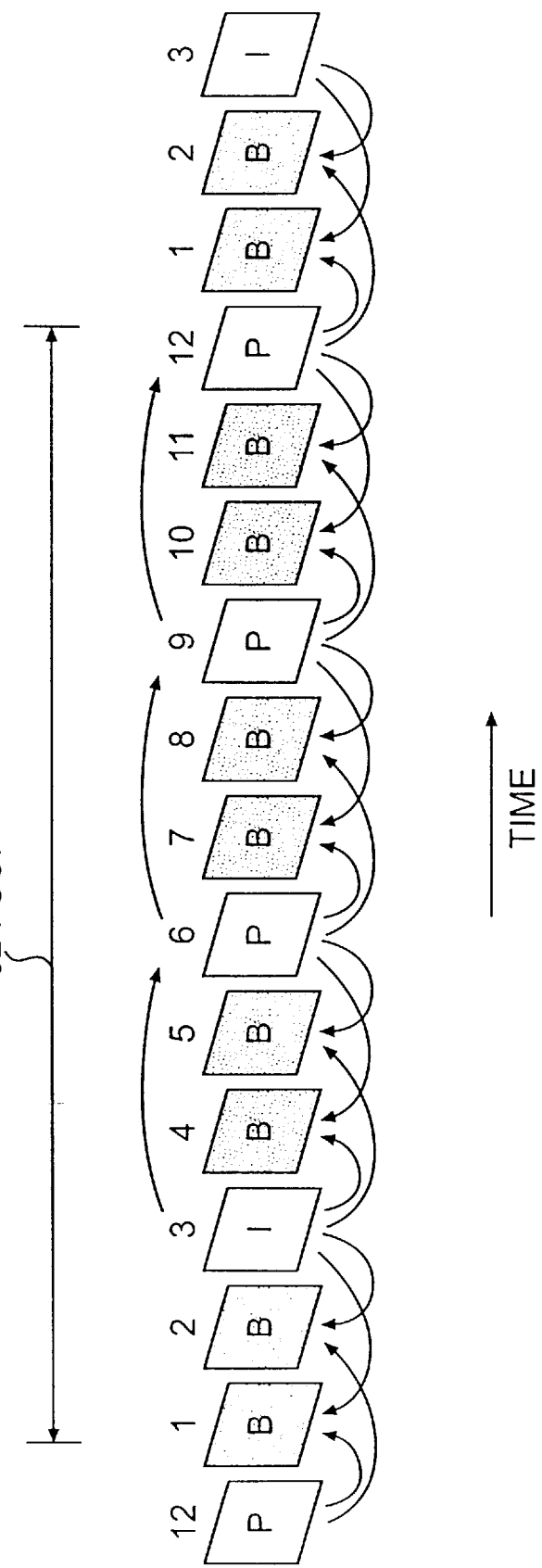
FIG. 2 is a diagram showing frame pictures constructing a GOP.

Further, the scheme of the above explained GOP is explained with reference to FIG. 2. FIG. 2 shows an example of a plurality of frame pictures constituting one GOP. In FIG. 2, a case where one GOP 52 consists of 12 frame pictures is illustrated (in the MPEG 2 method, the number of the frame pictures included in one GOP 52 is not fixed), for example. Among those frame pictures, a frame picture indicated by a reference sign "I" is called as an I picture (Intra-coded picture), which is defined as a frame picture able to be reproduced as a complete frame picture by use of its own picture information. A frame picture indicated by a reference sign "P" is called as a P picture (Predictive-coded picture), which is defined as a frame picture predicted or generated by decoding a difference from a predictive picture compensated and reproduced on the basis of the already decoded I picture or other picture. A frame picture indicated by a reference sign "B" is called as a B picture (Bidirectionally Predictive-coded picture), which is defined as a frame picture predicted or reproduced by use of not only the already decoded I picture or P picture but also the I picture or P picture which is recorded on the optical disk timely in the future relative to the pertinent B picture. In FIG. 2, the relationship in the prediction (i.e. the relationship in the compensation) between the respective pictures are indicated by arrows.

The MPEG 2 method used in the DVD 1 of the present embodiment employs a variable rate method, in which the data amount included in each GOP is not constant. Namely, in case that the respective pictures included in one GOP 52 correspond to a moving picture, which moving speed is rather fast and that the mutual relationship between the respective pictures is relatively small, the data amount constituting the respective pictures is increased, so that the data amount included in one GOP 52 is also increased. On the other hand, in case that the respective pictures included in one GOP 52 correspond to a moving picture which moving speed is rather slow and that the mutual relationship between the respective pictures is relatively large, the data amount constituting the respective pictures is decreased, so that the data amount included in one GOP 52 is also decreased.

In the above explained record format having a hierarchical structure as shown in FIG. 1, each division can be freely set according to the author's intention, so as to perform recording on the basis of these set divisions. By performing the reproduction on the basis of a later described logical structure for each of these divisions, the variegated reproduction can be performed.

Nextly, a logical format (logical structure) constructed by combining the information recorded by the physical divisions shown in FIG. 1 is explained with reference to FIG. 3. The information is not actually recorded on the DVD 1 in the logical structure of FIG. 3. Instead, information (e.g. access information or time information) to reproduce each data shown in FIGS. 1 to 3 by combining them (especially combining the cells 20) in the logical structure shown in FIG. 3, is recorded on the DVD 1, especially in the control data 11.

Figure 3:
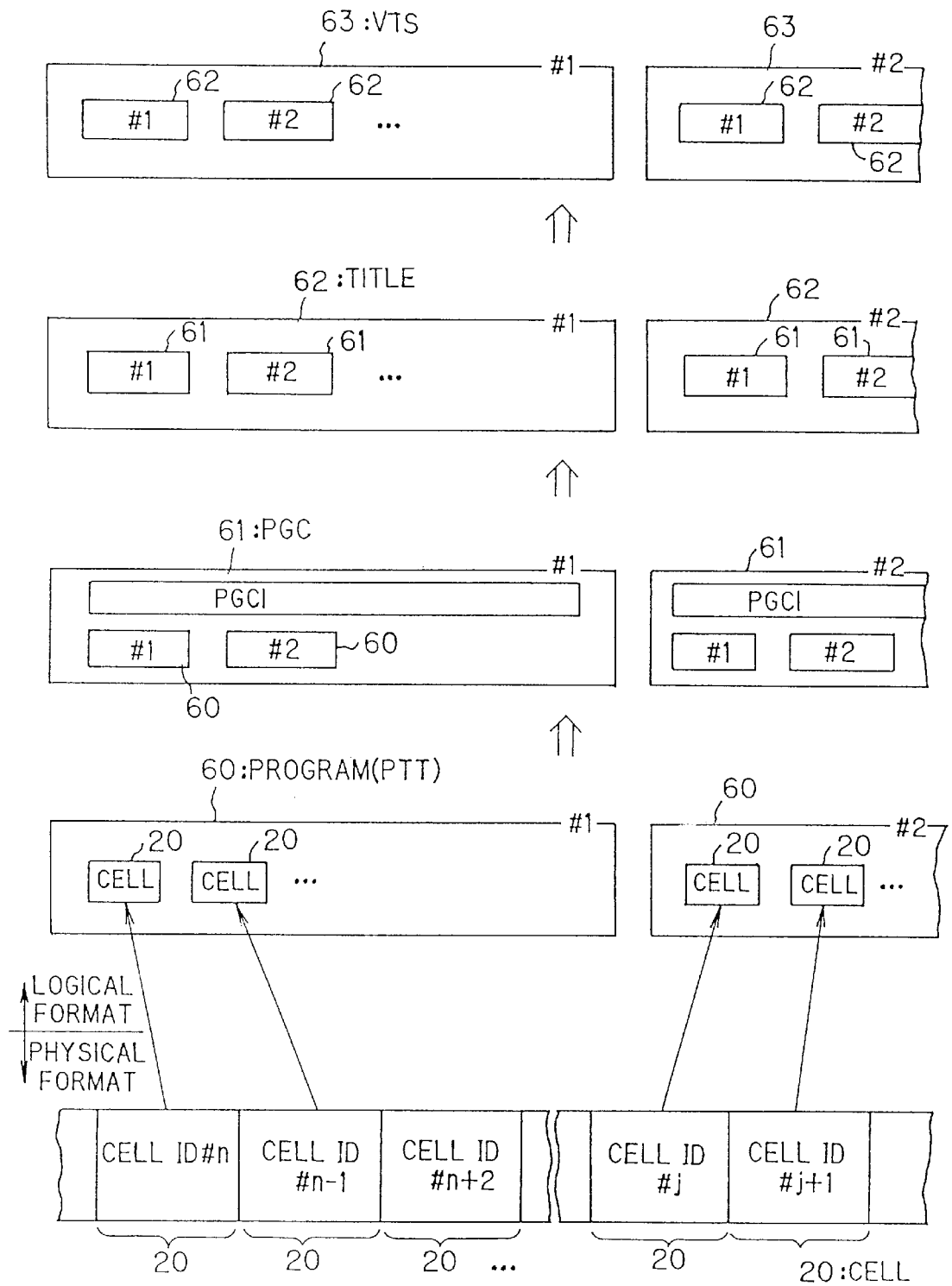
FIG. 3 is a diagram showing a logical structure of the record information of the DVD in FIG. 1.

To make the explanation clear, the following explanation is made from the lower hierarchical layer in FIG. 3. One program 60 is logically constructed on the basis of the author's intention by selecting and combining a plurality of cells 20 among the physical structures explained by use of FIG. 1. The program 60 is also a minimum logical unit, which division can be identified by a system controller of a reproducing apparatus described later and which can be accessed by use of a command by the system controller. It is also possible for the author to define a gathering of one or more programs 60 as a minimum unit, which can be freely selected to be watched or listened to by the audience and which is referred to as a PTT (ParT of Title).

Since one program 60 is logically constructed by selecting a plurality of cells 20, it is possible to use one cell commonly for a plurality of programs 60, namely to perform a so-called "alternative usage" of the cell 20 in which one cell 20 is reproduced in a plurality of different programs 60.

Here, as for the number of each cell 20, at a time of treating the cell 20 on the physical format shown in FIG. 1, the number is treated as the cell ID number (which is indicated by cell ID # in FIG. 1). On the other hand, at a time of treating the cell 20 on the logical format shown in FIG.

3, the number is treated as the cell number in the order of description in the PGCI described later.

Next, by combining a plurality of programs 60, one PGC (Program Chain) 61 is logically constructed on the basis of the author's intention. The aforementioned PGCI (ProGram Chain Information) is defined by a unit of the PGC 61. The PGCI includes information indicating: the reproduction order for each program 60 at a time of reproducing each program 60 (by this reproduction order, a unique program number (#1, #2, . . . ) is assigned to each program 60); the reproduction order for each cell 20 (by this reproduction order, a unique cell number is assigned to each cell 20); an address which is a record position of each cell 20 on the DVD 1; the number of the cell 20 positioned at the head of one program 60 to be firstly reproduced; a reproduction method for each program 60 [it is possible for the author to select one reproduction method out of (i) a random reproduction (which is a random reproduction by use of random numbers, and the same program 60 may be reproduced by a plurality of times), (ii) a shuffle reproduction (which is a random reproduction by use of random numbers in the same manner as the random reproduction, but one program 60 is reproduced just once but not reproduced by a plurality of times), (iii) a loop reproduction (which is a reproduction to reproduce one PGC 61 repeatedly), and (iv) a combination of the loop reproduction with the random reproduction or the shuffle reproduction, as a reproduction method to be employed at a time of reproduction]; and various commands (e.g. commands able to be specified by the author for each PGC 61 or each cell 20). The recording position of the PGCI on the DVD 1 may be in the control data 11 as aforementioned, or in a control data (not illustrated) in the video manager 2 if the pertinent PGCI is related to the menu in the video manager 2 (refer to FIG. 1).

In one PGC 61, the substantial video and audio data etc. are included as a combination of the programs 60 (in other words, the combination of the cells 20) other than the above mentioned PGCI.

Further, in one PGC 61, it is possible to perform the alternative usage of the cell 20 as explained before in the explanation for the program 60 (i.e. such a usage that the same cell 20 is commonly used by a plurality of different PGC 61). As the method of reproducing the cell 20 to be used, the author can select a method of reproducing the cells 20 in an order regardless of the recording order on the DVD 1 (i.e. the method of reproducing the cells discontinuously arranged, for example, the method of reproducing the cell 20 prior which is recorded posterior on the record track) other than a method of reproducing the cell 20 in the recording order on the record track on the DVD 1 as it is (i.e. the method of reproducing the cells continuously arranged).

Then, one title 62 is logically constructed of one or a plurality of PGCs 61 (PGC #1, PGC#2, . . . ) as shown in FIG. 3. The title 62 is, for example, a unit corresponding to one movie, and is completed information which the author would like to offer to the audience of the DVD 1.

Finally, one VTS 63 is logically constructed of one or a plurality of titles 62 (title #1, title #2, . . . ) as shown in FIG. 3. The title 62 included in the VTS 63 has the attributes common to each other. For example, the movies based on one movie but in different languages correspond to the respective titles 62. The information included in one VTS 63 shown in FIG. 3 corresponds to information included in one VTS 3 shown in FIG. 1. Namely, all information included in the logical VTS 63 shown in FIG. 3 is recorded as one VTS 3 in the DVD 1 shown in FIG. 1.

As the author specifies the information divided in the physical structure on the DVD 1 on the basis of the above described logical format, the video image (e.g. the movie image) for the audience to watch is to be formed.

In the explanations for the physical structure shown in FIG. 1, for the easy understanding of the content, it has been explained such that a plurality of cells 20 are recorded in the order of the ID numbers. However, in the DVD 1 of the present embodiment, one cell 20 may be divided into a plurality of interleaved units IU to be actually recorded on the DVD 1, as shown in FIG. 4.

Figure 4:
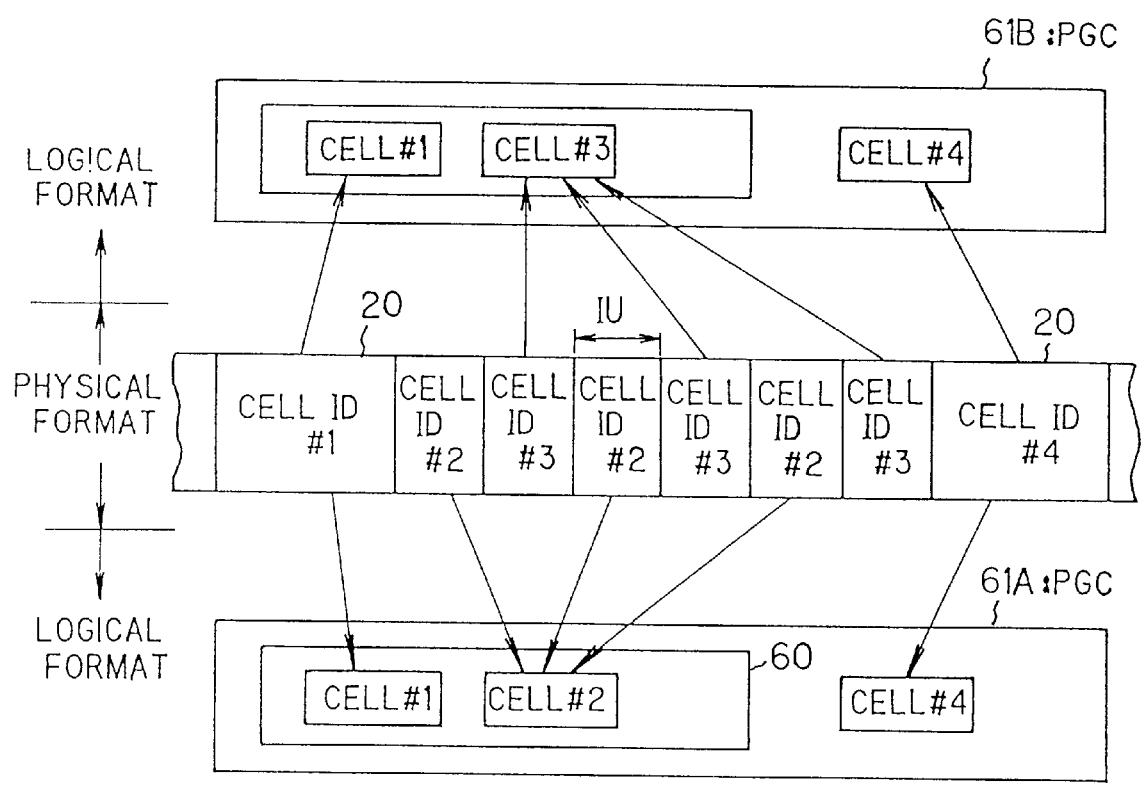
FIG. 4 is a diagram showing a structure of an interleaved unit of the DVD in FIG. 1.

Namely, as shown in FIG. 4, it is assumed that the author constructs one PGC 61A of the cells 20 having the ID numbers 1, 2 and 4, and constructs another PGC 61B of the cells 20 having the ID numbers 1, 3 and 4. In this case, at a time of reproducing the information from the DVD 1 on the basis of the PGC 61A, only the cells having the ID numbers 1, 2 and 4 are reproduced, while, at a time of reproducing the information from the DVD 1 on the basis of the PGC 61B, only the cells 20 having the ID numbers 1, 3 and 4 are reproduced. In the case of the PGC 61A for example, if the cells 20 are recorded spaced from each other for each ID number, a certain time period to jump the optical pickup from the record position of the cell 20 having the ID number 2 on the DVD 1 to the record position of the cell 20 having the ID number 4 on the DVD 1 is required in the reproduction. This results in that the continuous reproduction (hereinafter, it is referred to as a "seamless reproduction") of the cell 20 having the ID number 2 and the cell 20 having the ID number 4 may not be possible depending on a capacity of a track buffer of the reproducing apparatus described later.

Therefore, in the case shown in FIG. 4, the cell 20 having the ID number 2 and the cell having the ID number 3 are divided into interleaved units IU and are recorded by the interleaved units IU, each having a length, which does not destroy the continuity of an output signal of the track buffer even if an input signal to the track buffer is temporarily stopped, in correspondence with an input and output processing speeds at a track buffer of the reproducing apparatus described later (i.e. the interleaved units IU, each having a length which allows the track buffer to continuously output the output signal even if the input signal to the track buffer is ceased while the optical pickup jumps for the interval of one interleaved unit IU). For example, in case of reproduction based on the PGC 61A, only the interleaved units IU constructing the cell 20 corresponding to the ID number 2 are continuously detected to be reproduced. In the same manner, in case of reproduction based on the PGC 61B, only the interleaved units IU constructing the cell 20 corresponding to the ID number 3 are continuously detected to be reproduced. The length of the interleaved unit IU may be determined with considering the capability of a driving mechanism such as a slider motor to perform the track jump, in addition to the memory capacity of the track buffer.

In this manner, by dividing one cell 20 into a plurality of interleaved units IU and recording them according to the author's intention, the signal outputted from the track buffer can be continuous even at a time of reproducing the PGC 61 including the cells 20 having the discontinuous ID numbers, so that it is possible for the audience to watch continuous reproduction video image.

Each interleaved unit IU is completed in one VOB 10, and does not stride over two adjacent VOBs 10. As for the relationship between the interleaved unit IU and the VOB unit 30, one or a plurality of VOB units 30 are included in one interleaved unit IU. One VOB unit 30 is completed in one interleaved unit IU, and is not divided into a plurality of interleaved units IU or does not strides over a plurality of interleaved units IU.

Since it is necessary to record the information at various hierarchy classes explained above, the record information having the above explained recording format is suitable for an information record medium having a large memory capacity, such as the aforementioned DVD 1, which memory capacity is so large that audio voices or subtitles in various kinds of languages in addition to the movie itself can be recorded on a single optical disk as for the audio voice or subtitle of the movie.

Nextly, among the video information and the audio information having the above mentioned physical structure and logical structure, the DSI data 51 especially related to the present invention is explained with reference to FIG. 5.

In the DSI data 51, the search information to search the information to be reproduced and displayed, more concretely, the information to search the video image to be reproduced and displayed by the unit of the aforementioned VOB unit 30 and the information to perform the aforementioned seamless reproduction are recorded or described as aforementioned.

These informations are classified as following.
(1) information to set a timing of each constitutional element in the reproducing apparatus described later, at a time of starting a certain operation specified by the audience
(2) information to recognize a position on the DVD 1, which corresponds to the data division on the logical structure shown in FIG. 3, of the optical pickup of the reproducing apparatus described later
(3) information to write only the data to be reproduced and displayed into a track buffer of the reproducing apparatus described later
(4) information to indicate a record position (i.e. a target or destination position) on the DVD 1 of the data to be accessed (detected)
(5) protection information to protect the other data etc., if a desired data address cannot be searched at a time of searching the data for accessing.

Nextly, it is explained with reference to FIG. 5, how to concretely record each of the above mentioned informations in the DSI data 51, to which the information classified in the above mentioned manner are to be recorded.

As shown in FIG. 5, DSI data 51 includes several kinds of information. Namely, general information is used in common for one DSI data 51. Seamless information is used for seamless reproduction. Angle jump destination information is used for an angle reproduction, which will be described later. VOB unit search information is used to search a desired VOB unit 30. Synchronous reproduction information is related to the sub picture data 44 and the audio data 43, which are to be displayed and outputted in synchronization with the VOB unit 30 containing the pertinent DSI data 51. Among these information, the VOB unit search information is used especially in the special reproductions, such as the fast forwarding or the rewinding of the data while outputting video images, the N times speed reproduction (i.e. reproducing the data N times as fast as the normal speed), the time search (i.e. the search based on time) and so on.

The outline of the angle switch reproduction using the angle jump destination information will now be described. It is possible for the DVD 1 of the present embodiment to store different video images of one scene taken from different standpoints or angles (i.e., camera angles) at the same time point on the time axis in one movie film (title 62). For example, an image seen through the actor's eyes and an image seen through the actress's eyes with respect to the same scene in the same movie film can be recorded. These images can be switched in response to the audience's selection by use of the menu screen based on the highlight information. This technique is called as the "angle switch reproduction".

Nextly, each information shown in FIG. 5 is explained. The general information includes: time information for setting a reproduction start timing of each constitutional element of the reproducing apparatus described later as for a certain operation specified by the audience; a recording position (logical address) on the DVD 1 of each data consisting the logical structure of FIG. 3; protection information for protecting other data when the address of one desired data is not detected during data search; and time information (e.g., time elapse information within the cell 20) for the time search in the reproducing apparatus described later.

The seamless information includes a recording position (logical address) on the DVD 1 of data required for the seamless reproduction, and the time information for setting connection timing of each reproduced picture plane in advance.

Further, the angle jump information includes address information indicating the recording position on the DVD 1 which is to be reproduced when the angle switch reproduction is performed by seamlessly (continuously) switching the angles.

The VOB unit search information includes address information indicating recording positions on the DVD 1 of other VOB units 30 (other navi-packs 41) existing within a predetermined range at the vicinity of the pertinent DSI data 51.

Finally, the synchronous reproduction information includes address information indicating the recording position on the DVD 1 of the sub picture data 44 or audio data 43, which is to be displayed or outputted in synchronization with the VOB unit 30 containing the pertinent DSI data 51.

By using the DSI data 51 containing several types of informations described above, the reproducing apparatus described later can perform the processes such as the time search or the like.

Figure 6:
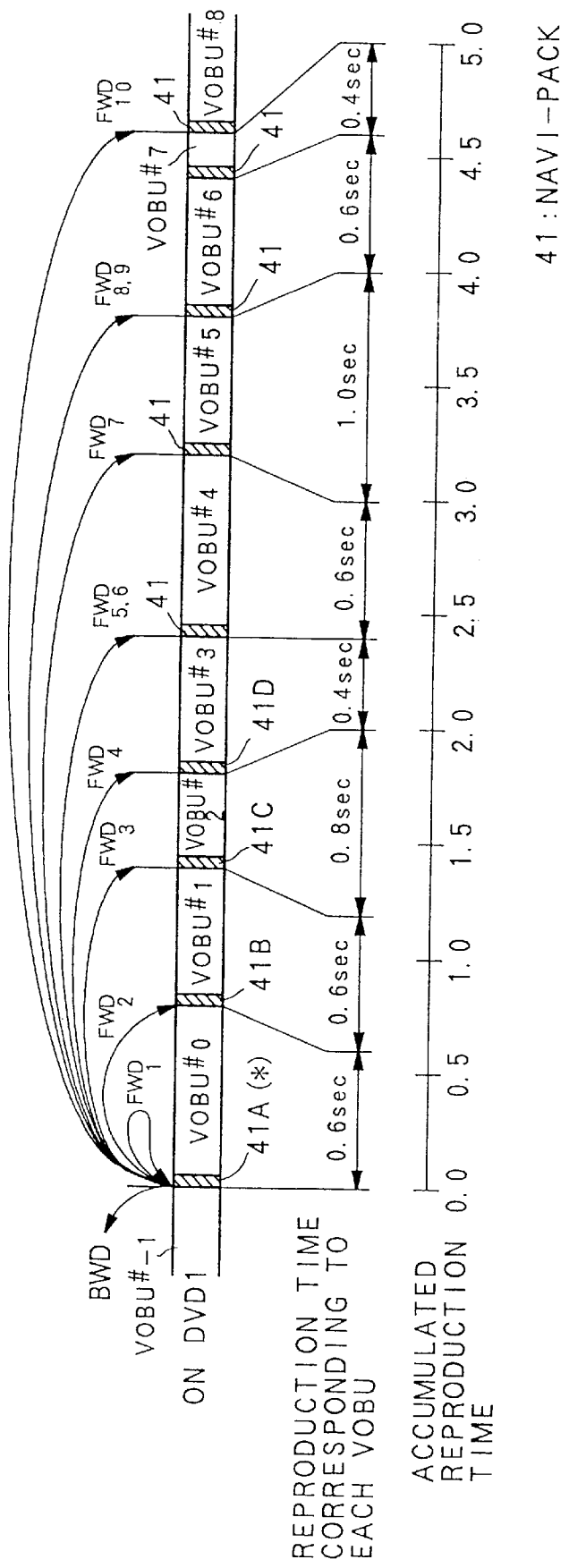
FIG. 6 is a diagram for explaining VOB unit search information.

Among the informations contained in the DSI data 51, the VOB unit search information will be explained in more detail, referring to FIG. 6. FIG. 6 shows the relationships among the information written as the VOB unit search information, the actual recording position on the DVD 1, and the reproduction time. In FIG. 6, "FWD" denotes that the recording position is located forward on the DVD 1 (i.e., later or after on the axis of reproduction time), and "BWD" denotes that the recording position is located backward on the DVD 1 (earlier or before on the axis of reproduction time).

As shown in FIG. 6, assuming a navi-pack 41A bearing a symbol "*" as a current navi-pack 41, the VOB unit search information written in the navi-pack 41A includes the address informations indicating each recording position on the DVD 1 of the VOB unit 30 which is to be started or reproduced (0.5×n) seconds(n is a natural number) after the navi-pack 41A, or each recording position on the DVD 1 of VOB unit 30 which was started or reproduced (0.5×n) seconds (n is a natural number) before the navi-pack 41A, for each time. More particularly, in the case shown in FIG. 6, the VOB unit search information corresponding to the FWD1 describes the VOB unit which is to be started or reproduced 0.5 seconds after the VOB unit #0 having the navi-pack 41A. In FIG. 6, since the VOB unit #0 has the reproduction time of 0.6 seconds, the VOB unit search information corresponding to the FWD1 describes an address indicating the recording position on the DVD 1 of the VOB unit #0 itself.

In the VOB unit search information corresponding to FWD2, the VOB unit, which is to be reproduced 1.0 (=0.5×2) second after the VOB unit #0 having the navi-pack 41A, is described. In case of FIG. 6, since the reproduction time of the VOB unit #0 is 0.6 seconds, and the reproduction time of the VOB unit #1 is also 0.6 seconds, the VOB unit search information corresponding to FWD 2 has an address indicating an address indicating the recording position on the DVD 1 of the VOB unit 30, which is to be reproduced 1.0 second after the navi-pack 41A, i.e. the VOB unit #1. Similarly, the VOB unit search information within the navi-pack 41 has the addresses of the VOB units 30 located before and after 2 minutes from the pertinent navi-pack 41. FIG. 7 shows an example of the VOB unit search information described in this manner. In FIG. 7, "FWDA" denotes a forward address, and "BWDA" denotes a backward address. The subsequent address number corresponds to a number of (associated reproduction time×2).

By the way, the video information recorded on the DVD 1 includes both of the moving pictures and the still pictures as above mentioned. Therefore, the video information contained in each VOB unit also includes the video information corresponding to the moving picture and the video information corresponding to the still picture. In this case, there are four types of VOB units, i.e., the VOB unit 30 containing only the moving picture, the VOB unit 30 containing both of the moving picture and the still picture, the VOB unit 30 containing only the still pictures, and the VOB unit 30 containing only the navi-pack 41 without the video data 42.

Figure 8:
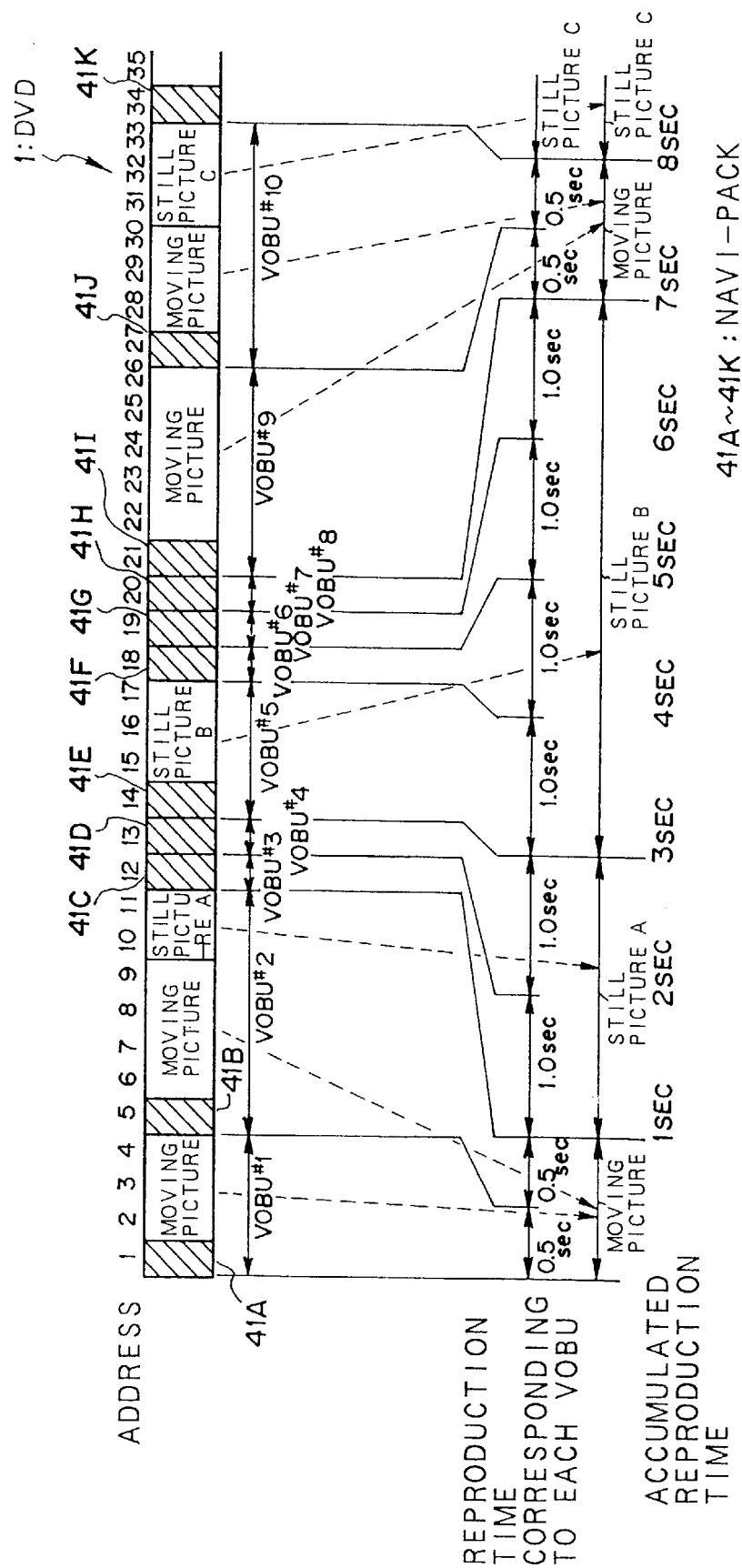
FIG. 8 is a diagram showing the relationship between the reproduction time and VOB units in case that moving pictures and still pictures are mixed.

FIG. 8 shows an example of these types of VOB units. In the Figure, VOB units #1 and #9 contain only the moving picture. VOB units #2 and #10 contain both of the moving picture and the still picture. VOB unit #5 contains only the still picture. VOB unit #3, #4, #6, #7, and #8 contain only the navi-pack 41. In this example, only the navi-pack 41 is continuously recorded on the DVD 1 (navi-packs 41C, 41D, 41E, 41F, 41G, 41H and 41I in FIG. 8). In FIG. 8, the information other than the video data 42, that is, the audio data 43 and the sub picture data 44 are omitted.

In the structure of FIG. 8, if only the address of the VOB unit 30 corresponding to a predetermined time after (or before) is written in the VOB unit search information, in case that this VOB unit 30 contains only the navi-pack 41, neither video image nor audio sound is outputted at all even if the pickup of the reproducing apparatus is moved to this VOB unit 30 because no data to be reproduced is contained in it. More concretely, in the example of FIG. 8, if only the address of the VOB unit 30 corresponding to a predetermined time after (or before) is simply written, even if those VOB units 2 seconds after, 4 seconds after and 6 seconds after are searched by the scanning operation (jumping operation), no video image is outputted because there is no video data 42 contained in those VOB units 30 at these timings.

As described above, the VOB unit 30 always contains the navi-pack 41 corresponding to each reproduction time at the head thereof. However, the substantial data, such as the video data 42, the audio data 43, or the sub picture data 44, which is to be reproduced at that reproduction time is not always recorded following the navi-pack in the VOB unit 30. Therefore, in order to obtain the recording position of the substantial data (the video data 42, the audio data 43, or the sub picture data 44) on the DVD 1 which must be reproduced at that reproduction time, the recording position information indicating the recording position is written in the navi-pack 41 recorded at the head of the video data 42 etc. to be reproduced. And that, in case of reproducing the data corresponding to the desired reproduction time, the navi-pack 41 recorded at the head of the VOB unit 30 corresponding to that reproduction time is firstly obtained, and the recording position of the desired substantial data (e.g., the video data 42) to be reproduced on the DVD 1 is obtained on the basis of the recording position information written in the firstly obtained navi-pack 41.

To this end, in the present invention, the DSI data 51 in the navi-pack 41 has the VOB unit search information as described below.

(A) The First Embodiment of VOB Unit Search Information

The first embodiment of the VOB unit search information will be firstly described.

The VOB unit search information of the first embodiment has, in addition to the address of the VOB unit 30 corresponding to a predetermined time after (or before), the address of the VOB unit 30 containing the video data 42 (refer to FIG. 1) corresponding to the video image which is to be actually reproduced at each reproduction time, with respect to the navi-pack 41 containing the pertinent VOB unit search information as a reference.

FIG. 9 shows one example of the actual structure of the VOB unit search information of the first embodiment, which is based on the example of FIG. 8 while using the terms shown in FIG. 7. In FIG. 9, the start address of the VOB unit 30 corresponding to a predetermined time after (or before) the navi-pack 41A is described as a VOB unit address A. The start address of the VOB unit 30 containing the video data 42 which should be actually reproduced (outputted) at a predetermined time after (or before) the navi-pack 41A is described as VOB unit address B. The VOB unit address A is used to search the navi-pack 41 contained in each VOB unit, so as to perform various search operations (e.g., a search operation for data other than video data 42 (i.e., audio data 43 or sub picture data 44)) based on the information written in the navi-pack 41. The VOB unit address B is used to search the video data 42 which should be actually reproduced at that reproduction time.

The VOB unit address B is a feature of the invention. The VOB unit 30 which has the video data 42 (still picture A) to be reproduced 1.0 second after the navi-pack 41A ("FWDA2") is the VOB unit #2, from FIG. 8. Since the start or top address of the VOB unit #2 is "5", the VOBU address B of FIG. 9 has the address "5". Similarly, VOB unit 30 which has the video data 42 (still picture A) to be reproduced 2.0 seconds after the navi-pack 41A ("FWDA4") is also the VOB unit #2, and accordingly, the start or top address "5" of the VOB unit #2 is written as the VOBU address B.

On the other hand, the VOB unit 30 which has the video data 42 (still picture B) to be reproduced 4.0 seconds after the navi-pack 41A ("FWDA8") is the VOB unit #5, and the start address "14" is written. In this manner, the VOB unit search information written in the navi-pack 41 contains the addresses of the VOB units 30 corresponding to the video images which are to be actually reproduced at the respective reproduction times. Concerning a period during which a single still picture is continuously outputted, the address of the same VOB unit 30 is repeatedly written.

By using the VOB unit search information, an appropriate VOB unit 30 which contains the video data 42 to be actually reproduced can be searched, so that it is possible to perform the reproduction without breaking or cutting the reproduced video image.

(B) The Second Embodiment of VOB Unit Search Information

The second embodiment of VOB unit search information will be described below.

In the first embodiment described above, the VOB unit search information contains both of the address of the VOB unit 30 (i.e., the VOB unit address A), which simply corresponds to a reproduction time after (or before) a predetermined period of time, and the address of the VOB unit 30 (i.e., the VOB unit address B), which contains the video data 42 to be actually reproduced at that reproduction time with respect to the navi-pack 41 having the pertinent VOB unit search information as a reference. In contrast to this, the second embodiment utilizes an empty space (blanked area) which is left when writing the address of the VOB unit 30 corresponding to a reproduction time after (or before) a predetermined period of time. Namely, in the second embodiment, the information indicating only the presence or absence of the video data 42 in each VOB unit 30 and the information indicating the presence or absence of the video data 42 in the VOB units 30 which correspond to a predetermined range of reproduction time, are described into this empty area.

FIG. 10 shows an example of the actual structure of the VOB unit search information of the second embodiment, which is based on the example of FIG. 8 while using the terms shown in FIG. 7. In FIG. 10, the VOB unit address A indicates the start address of the VOB unit 30 corresponding to a predetermined time after (or before) the navi-pack 41A, similarly to the first embodiment.

Presence information A (1 bit) indicates the presence or absence of video data 42 in each reproduction time. This information (i.e., information as to whether or not there is the video data 42 (moving picture or still picture) in each VOB unit) is written so as to correspond to each VOB unit, which address is written in the column of VOB unit address A. In the example of FIG. 10, the video data 42 exists in each of the VOB units #1, #2, #5, #9, and #10, and each of the corresponding rows of "PRESENCE INFORMATION A" has a value "1".

On the other hand, presence Information B (1 bit) indicates the presence or absence of the video data 42 in a predetermined range of reproduction time. In FIG. 10, each of the rows corresponding to "FWDA1" through "FWDA15", and "BWDA1" through "BWDA15" has a value "0". This is to avoid duplicated writing because, in this range of reproduction time, the contents of "PRESENCE INFORMATION B" is the same as the contents of "PRESENCE INFORMATION A".

On the other hand, as for the presence information B of "FWDA20", "FWDA60", "FWDA120" and "FWDA240", for example, the presence information B of "FWDA 20" has a value "1" if the video data 42 exists in the range from the VOB unit 30 located next to the VOB unit 30 of the previous row (FWDA 15) (i.e., the VOB unit 30 located next to VOB unit #10 in FIG. 8) to the VOB unit 30 immediately before the VOB unit 30 corresponding to the "FWDA 20". If there is no video data 42 existed in this range, a value "0" is written in the row of FWDA20. Similarly, in the presence informations B of FWDA60, FWDA120 and FWDA240, a value "1" is written, if the video data 42 exists in the range from the VOB unit 30 located next to the VOB unit 30 of the previous row to the VOB unit 30 immediately before the VOB unit 30 corresponding to respective one of the presence informations B, and a value "0" is written if there is no video data 42 existed in this range.

Regarding the presence informations B of BWDA20, BWDA60, BWDA120, and BWDA240, a value "1" is written if the video data 42 exists in the range from the VOB unit 30 next to the VOB unit 30 of the next row (i.e., the row directly above the current row in FIG. 10) to the VOB unit 30 next to the VOB unit corresponding to respective one of the presence informations B, while a value "0" is written if there is no video data 42 existed in this range.

By using the VOB unit search information of the second embodiment during reproduction by the reproducing apparatus described later, the record information can be reproduced without breaking or cutting the video image, with the same effect as the first embodiment. In the first embodiment, a relatively large amount of recording area is required to construct the VOB unit search information, since the recording area same in size as the VOB unit address A is assigned for the VOB unit address B. As compared with this, the second embodiment has such an advantage that the recording area for constructing the VOB unit search information can be reduced because the presence information A and the presence information B are written by utilizing the surplus area left after the VOB unit address A has been written. For this reason, the VOB unit search information of the second embodiment is preferably recorded on the DVD 1 in practice.

(II) Embodiment of Recording Apparatus

Next, an embodiment of recording apparatus for recording the above mentioned control information, video information and audio information onto the DVD 1 will be explained with reference to FIG. 11.

At first, a construction and an operation of the recording apparatus as the embodiment is explained with reference to FIG. 13.

Figure 11:
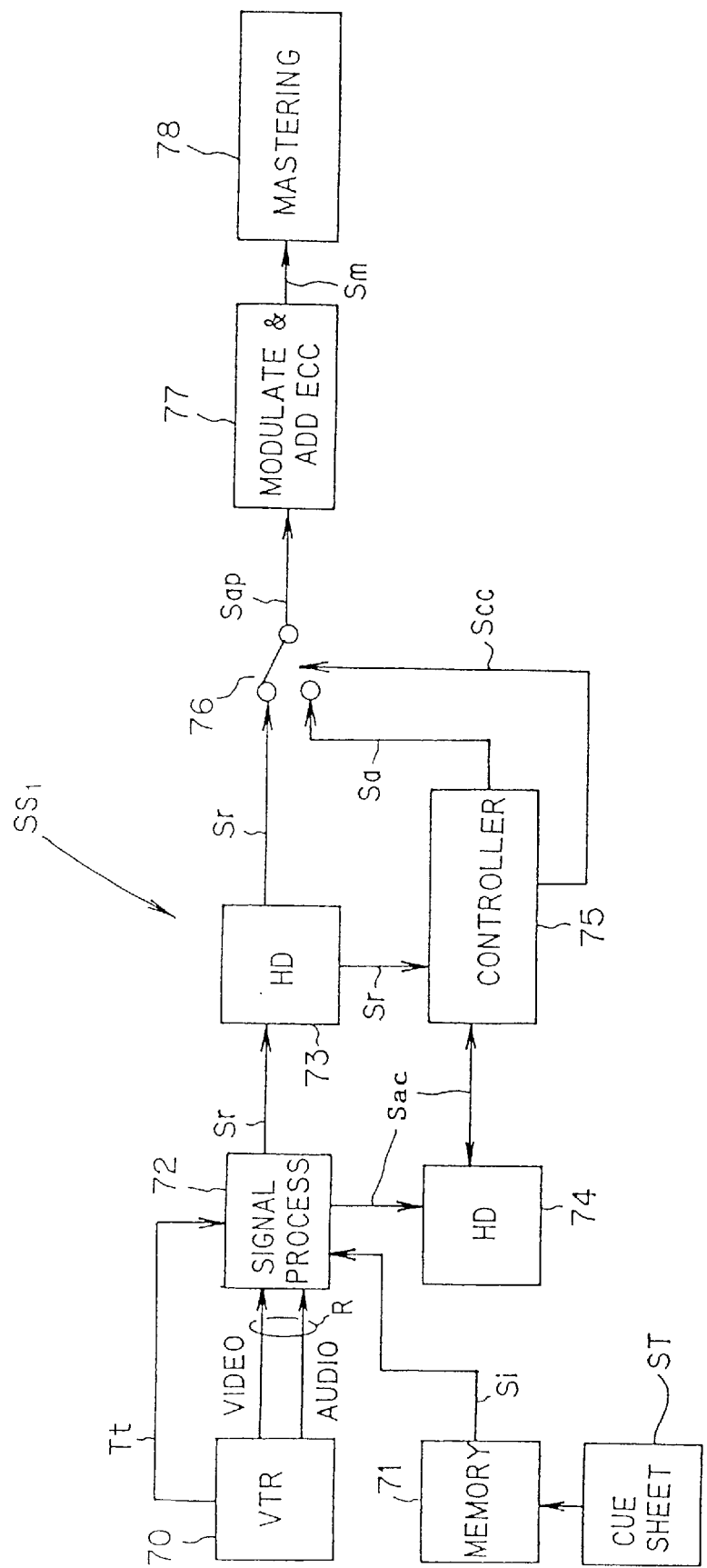
FIG. 11 is a block diagram of an information recording apparatus, as another embodiment of the present invention.

As shown in FIG. 11, a recording apparatus SS1 as the present embodiment is provided with: a VTR (Video Tape Recorder) 70; a memory 71; a signal process unit 71; a hard disk (HD) device 73; a hard disk (HD) device 74; a controller 75; a multiplexer 76; a modulator 77;

and a mastering device 78.

Nextly, an operation of the present embodiment is explained.

Record information R, which is a raw material such as audio information, video information etc. to be recorded on the DVD 1, is temporarily recorded in the VTR 70. Then, the record information R temporarily record in the VTR 70 is outputted to the signal process unit 72 by a request from the signal process unit 72.

The signal process unit 72 applies an A/D (Analog to Digital) converting process to the record information R outputted from the VTR 70, applies a signal compressing process by the MPEG 2 method for it, time-axis-multiplexes the audio information and the video information and makes a space corresponding to the navi-pack 41 at a position to insert the navi-pack 41 to be multiplexed and recorded with the audio information and the video information, to output it as a compressed multiplexed signal Sr. After that, the compressed multiplexed signal Sr outputted therefrom is temporarily stored into the hard disk device 73.

Along with this, the memory 71 temporarily stores various control informations which are inputted beforehand on the basis of a cue sheet ST, on which the various control informations for controlling the reproduction of the record information R (i.e. the video manager 2, the control data 11, the navi-pack 41 (the PCI data 50 and the DSI data 51 including the above described VOB unit search information, and so on in FIG. 1) are written. Then, the memory 71 outputs it as a control information signal Si on the basis of a request from the signal process unit 72.

Then, the signal process unit 72 separates the DSI data including the above described VOB unit search information from the control information and outputs a search information signal Sac corresponding to it with referring to a time code Tt, on the basis of the time code Tt corresponding to the record information R outputted from the VTR 70 and the control information signal Si outputted from the memory 71. Then, the search information signal Sac is temporarily stored in the hard disk device 74. At this time, although illustrations of the control informations stored in the memory 71 other than the DSI data 51 are omitted in FIG. 11, they are generated in the signal process unit 72, and are stored in the hard disk device 74, in the same manner as the DSI data 51.

The above described processes are performed with respect to the whole record information R.

When the above described processes are finished as for the whole record information R, the controller 75 reads out the compressed multiplexed signal Sr from the hard disk device 73, reads out the search information signal Sac and other control information from the hard disk device 74, generates each of additional information including the DSI data 51, which contains the VOB unit search information (refer to FIG. 7), and other control information independently on the basis of these read out signals, and stores an additional information signal Sa corresponding to this generated additional information into the hard disk device 74. This is because there may be a control signal, which content is determined in dependence upon a generation result of the compressed multiplexed signal Sr among various control signals.

On the other hand, the controller 75 performs a time management for each of the operations of the signal process unit 72, the hard disk device 73 and the hard disk device 74, and reads out the additional information signal Sa from the hard disk device 74, and generates and outputs an information selection signal Scc to time-axis-multiplex the compressed multiplexed signal Sr and the additional information signal Sa.

After that, the compressed multiplexed signal Sr and the additional information signal Sa are time-axis-multiplexed by the multiplexer 76 to be outputted as an information added compressed multiplexed signal Sap in which the control information such as the DSI data 51 etc. within the additional information corresponding to the additional information signal Sa are described into the aforementioned space for the navi-pack 41. At the stage of this information added compressed multiplexed signal Sap, the record information R has such a physical structure that the control information such as the navi-pack 41 etc., the video information and the audio information are synthesized by the switching-over operation by the controller 75 by use of the information selection signal Scc as shown in FIG. 1. Further, the above described VOB unit search information is included in the corresponding DSI data 51 and thus included in the corresponding navi-pack 41.

If there exists the sub picture information to be recorded, it is inputted, by other means such as a hard disk device not illustrated, to the signal process unit 72, so that it is processed in the same manner as the video and audio information thereat.

Then, the modulator 77 adds an error correction code (ECC), such as a Reed Solomon code, and applies a modulation such as an eight to sixteen (8–16) modulation with respect to the information added compressed multiplexed signal Sap outputted from the multiplexer 76, and generates and outputs a disk record signal Sm to the mastering device 78.

Finally, the mastering device 78 records the disk record signal Sm to a stamper disk, which becomes a master (i.e. a cutting dye) for the production of an optical disk. Then, by use of this stamper disk, an optical disk as a replica disk, which can be on sale in the general market, i.e. the DVD 1, can be produced by a replication device not illustrated.

By the above explained operation of the information recording apparatus SS1, the record information R including the above described VOB unit search information is recorded on the DVD 1.

Therefore, at the time of reproducing the record information recorded in this manner, the video information to be reproduced can be speedily searched and reproduced by use of the above described VOB unit search information, so that it is possible to perform the reproduction of the record information while reproducing the video information precisely and smoothly.

Further, since the VOB unit search information is described in correspondence with the record information including the moving picture and the still picture, it is possible to speedily search and reproduce the moving picture or the still picture to be reproduced.

Furthermore, in case of performing the search of the video data 42 on the basis of the VOB unit search information of the second embodiment, since the presence or absence of the video data 42 is described as the presence information A and B, if the video data 42 is not included in the VOB unit, it is possible to reproduce without searching this VOB unit 30 including no video data 42, so that the reproduction of the video information can be performed speedily without interruption.

(III) Embodiment of Reproducing Apparatus

Next, an embodiment of reproducing apparatus for reproducing the information recorded on the DVD 1 by the above mentioned recording apparatus SS1 will be explained with reference to FIGS. 12 to 17.

At first, a construction and an operation of the reproducing apparatus as the embodiment is explained with reference to FIG. 12.

Figure 12:
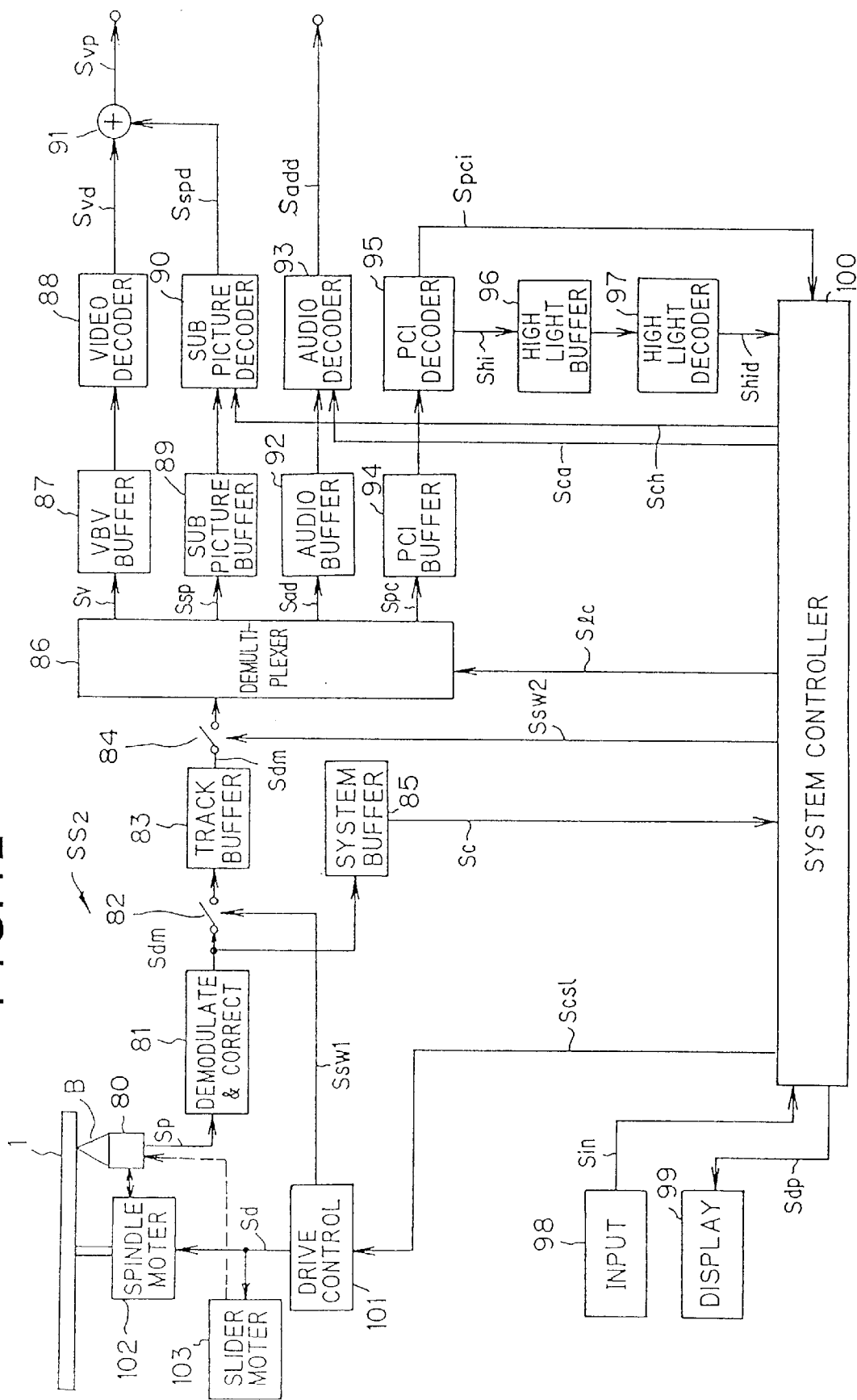
FIG. 12 is a block diagram of an information reproducing apparatus as another embodiment of the present invention.

As shown in FIG. 12, a reproducing apparatus SS2 as the present embodiment is provided with: an optical pickup 80; a demodulate and correct unit 81; stream switches 82 and 84; a track buffer 83; a system buffer 85; a demultiplexer 86; a VBV (Video Buffer Verifier) buffer 87; a video decoder 88; a sub picture buffer 89; a sub picture decoder 90; a mixer 91; an audio buffer 92; an audio decoder 93; a PCI (Presentation Control Information) buffer 94; a PCI decoder 95; a high light buffer 96; a high light decoder 97; an input unit 98; a display unit 99; a system controller 100; a drive controller 101; a spindle motor 102; and a slider motor 103. The construction shown in FIG. 12 only illustrates the portions related to the video and audio reproduction of the reproducing apparatus SS2. The description and the detailed explanation as for servo circuits to servo-control the optical pickup 80, the spindle motor 102, the slider motor 103 and the like are omitted since they are constructed in the same manner as the conventional arts.

Nextly, an overall operation of the present embodiment is explained.

The optical pickup 80 includes a laser diode, a polarization beam splitter, an objective lens, a photo-detector and the like not illustrated, and irradiates a light beam B as a reproduction light with respect to the DVD 1. The optical pickup 80 receives a reflection light of the light beam B from the DVD 1, and outputs a detection signal Sp corresponding to information pits formed on the DVD 1. At this time, the tracking servo control and the focus servo control are operated with respect to the objective lens etc. of the optical pickup 80 in the same manner as the conventional art so that the light beam B can be irradiated precisely onto the information track of the DVD 1 and that the light beam B can be focused on the information record surface of the DVD 1.

The detection signal Sp outputted from the optical pickup 80 is inputted to the demodulate and correct unit 81, where a signal demodulation process and an error correct process are applied to it to generate a demodulation signal Sdm, which is outputted to the stream switch 82 and the system buffer 85.

The opening and closing operation of the stream switch 82, to which the demodulation signal Sdm is inputted, is controlled by a switch signal Ssw1 from the drive controller 101. When it is closed, the stream switch 82 passes therethrough the inputted demodulation signal Sdm as it is to the track buffer 83. When it is opened, the demodulation signal Sdm is not outputted therethrough, so that unnecessary or useless information (signal) is not inputted to the track buffer 83.

The track buffer 83, to which the demodulation signal Sdm is inputted, consists of a FIFO (First In First Out) memory, for example. The track buffer 83 temporarily stores the inputted demodulation signal Sdm, and continuously outputs the stored demodulation signal Sdm when the stream switch 84 is closed. The track buffer 83 compensates a difference or fluctuation in the data amount between respective GOP under the MPEG 2 method, and continuously outputs the demodulation signal Sdm, which is discontinuously inputted due to a track jump in the aforementioned seamless reproduction, in case of reading the data divided into the interleaved units IU, so as to avoid the interruption of the reproduction due to the discontinuity.

The opening and closing operation of the stream switch 84, to which the demodulation signal Sdm is continuously inputted, is controlled by a switch signal Ssw2 from the system controller 100 such that the various buffers at its posterior stage may not be over-flown or, on the contrary, may not become empty to stop the decoding process, in the separating process by the demultiplexer 86.

On the other hand, the system buffer 85, to which the demodulation signal Sdm is inputted in parallel with the track buffer 83, accumulates the management information (e.g. the video manager 2) related to the whole information recorded on the DVD 1 which is detected firstly upon loading the DVD 1, or the control information 11 for each VTS 3. Then, the system buffer 85 outputs the accumulated data as one portion of a control information Sc to the system controller 100, and temporarily stores the DSI data 51 for each navi-pack 41 (refer to FIG. 1) while reproducing the information, to output it as another portion of the control information Sc.

The demultiplexer 86, to which the demodulation signal Sdm is continuously inputted through the stream switch 84, separates the video data 42, the audio data 43, the sub picture data 44 and the PCI data 50 for each navi-pack 41 respectively from the inputted demodulation signal Sdm, and outputs them as a video signal Sv, a sub picture signal Ssp, an audio signal Sad and a PCI signal Spc respectively to the VBV buffer 87, the sub picture buffer 89, the audio buffer 92 and the PCI buffer 94. There may be a case where, in the demodulation signal Sdm, different streams of the audio data 43 or the sub picture data 44 in a plurality of different languages are included as the audio or sub picture information. In that case, a desirable language is selected for the audio or sub picture information by a stream selection signal Slc from the system controller 100, so that the audio or sub picture information in the desirable language is outputted to the audio buffer 92 or the sub picture buffer 89.

The VBV buffer 87, to which the video signal Sv is inputted, consists of a FIFO memory, for example. The VBV buffer 87 temporarily stores the video signal Sv and outputs it to the video decoder 88. The VBV buffer 87 compensates the difference or fluctuation in the data amount between respective pictures of the video signal Sv compressed by the MPEG 2 method (refer to FIG. 2). Then, the video signal Sv in which the differences in the data amount are compensated, is outputted to the video decoder 88, and is decoded by the MPEG 2 method to be outputted as a decoded video signal Svd to the mixer 91.

On the other hand, the sub picture buffer 89, to which the sub picture signal Ssp is inputted, temporarily stores the inputted sub picture signal Ssp, and outputs it to the sub picture decoder 90. The sub picture buffer 89 is to synchronize the sub picture data 44 included in the sub picture signal Ssp with the video data 42 corresponding to the sub picture data 44, and to output it. Then, the sub picture signal Ssp synchronized with the video data 42 is inputted to the sub picture decoder 90 and is decoded to be outputted as a decoded sub picture signal Sspd to the mixer 91.

In a case where the sub picture signal Ssp includes video information to construct a frame, a selection button etc. for displaying the menu picture plane, the sub picture decoder 90 changes a display condition of the selection button etc. to be displayed, in the sub picture signal Sspd on the basis of a high light control information Sch from the system controller 100 to output it.

The decoded video signal Svd outputted from the video decoder 88 and the decoded sub picture signal Sspd outputted from the sub picture decoder 90 (which is in synchronization with the corresponding decoded video signal Svd) are mixed together by the mixer 91, and are outputted as a final video signal Svp to be displayed to a display device such as a CRT (Cathode Ray Tube) device not illustrated.

The audio buffer 92, to which the audio signal Sad is inputted, consists of a FIFO memory, for example. The audio buffer 92 temporarily stores the audio signal Sad and outputs it to the audio decoder 93. The audio buffer 92 is to synchronize the audio signal Sad with the video signal Sv or the sub picture signal Ssp including the corresponding video information, and delays the audio signal Sad in accordance with the output condition of the corresponding video information. Then, the audio signal Sad, which is time-adjusted to synchronize with the corresponding video information, is outputted to the audio decoder 93. Then, a predetermined decoding process is applied thereat to the audio signal Sad, on the basis of the header control signal Shc outputted from the system controller 100, and it is outputted as a decoded audio signal Sadd to a speaker etc. not illustrated.

If it is detected by the system controller 100 that it is necessary to temporarily stop (pause) the audio voice in the reproduction immediately after accessing the desired information, a pause signal Sca is outputted from the system controller 100 to the audio decoder 93, so that the output of the decoded audio signal Sadd is stopped temporarily at the audio decoder 93.

The PCI buffer 94, to which the PCI signal Spc is inputted, consists of a FIFO memory, for example. The PCI buffer 94 temporarily stores the inputted PCI signal Spc and outputs it to the PCI decoder 95. The PCI buffer 94 is to synchronize the PCI data 50, which is included in the PCI signal Spc, with the video data 42, the audio data 43 and the sub picture data 44 corresponding to the PCI data 50, and apply the PCI data 50 to the video data 42, the audio data 43 and the sub picture data 44. Then, from the PCI signal Spc, which is synchronized with the corresponding the video data 42, the audio data 43 or the sub picture data 44 by the PCI buffer 94, high light information included in the PCI data 50 is separated or extracted by the PCI decoder 95, and is outputted as a high light signal Shi to the high light buffer 96. The portion of the PCI data 50 other than the high light information is outputted as a PCI information signal Spci to the system controller 100.

The high light buffer 96, to which the high light signal Shi is inputted, consists of a FIFO memory, for example. The high light buffer 96 temporarily stores the inputted high light signal Shi and outputs it to the high light decoder 97. The high light buffer 96 is to time-compensate the high light signal Shi so as to precisely perform a change in the display condition of the selection item, which corresponds to the high light information, in correspondence with the sub picture signal Ssp which includes the video information for the high light information. Then, the time-compensated high light signal Shi is decoded by the high light decoder 97, and the information included in the high light signal Shi is outputted as a decoded high light signal Shid to the system controller 100. The information to set the value of the register in the system controller 100 is included in this decoded high light signal Shid.

Here, the system controller 100 outputs the aforementioned high light control signal Sch to change the display condition by the high light information, on the basis of the decoded high light signal Shid.

Further, on the basis of the control information Sc inputted from the system buffer 85, the PCI information signal Spci inputted from the PCI decoder 95 and an input signal Sin inputted from the input unit 98 such as a remote controller, the system controller 100 outputs the aforementioned switch signal Ssw2, a stream selection signal (e.g. a language selection signal) Slc, the pause signal Sca and the high light control signal Sch to correctly perform the reproduction corresponding to those input signals, and also outputs a display signal Sdp to display an operation condition etc. of the reproducing apparatus SS2 to the display unit 99 such as the liquid crystal device.

Furthermore, the system controller 100 outputs a seamless control signal Scs1 corresponding to the track jump process, to the drive controller 101, when it detects by the control signal Sc etc. that it is necessary to perform the track jump process such as a search in order to perform the seamless reproduction.

Then, the drive controller 101, to which the seamless control signal Scs1 is inputted, outputs a drive signal Sd to the spindle motor 102 or the slider motor 103. By this drive signal Sd, the spindle motor 102 or the slider motor 103 moves the optical pickup 80 such that the record position to be reproduced on the DVD 1 is irradiated with the light beam B (refer to an arrow of a broken line in FIG. 12), and the spindle motor 102 CLV-controls (Constant Linear Velocity-controls) the rotation number of the DVD 1. Along with this, the drive controller 101 outputs the aforementioned switch signal Ssw1 on the basis of the seamless control signal Scs1, so as to open the stream switch 82 when the demodulation signal Sdm is not outputted from the demodulate and correct unit 81 while the optical pickup 80 is being moved, and so as to close the stream switch 82 when the demodulation signal Sdm is started to be outputted, so that the demodulation signal Sdm is outputted to the track buffer 83.

Next, among the operations of the reproducing apparatus SS2, the search operation using the VOB unit search information of the present invention will be explained, mainly as for the operation of the system controller 100. In the example of the reproduction operation described below, the VOB unit search information of the second embodiment (FIG. 10) is used.

(A) Embodiment of 60 Times Speed Visual Scan

First of all, explanation will be made on visual scan sixty times as fast as the normal speed (referred to as "60 times speed visual scan") using the presence information A among the VOB unit search information, with reference to FIGS. 13 and 14.

The outline of the 60 times speed visual scan will be described by use of FIG. 13.

Figure 13:
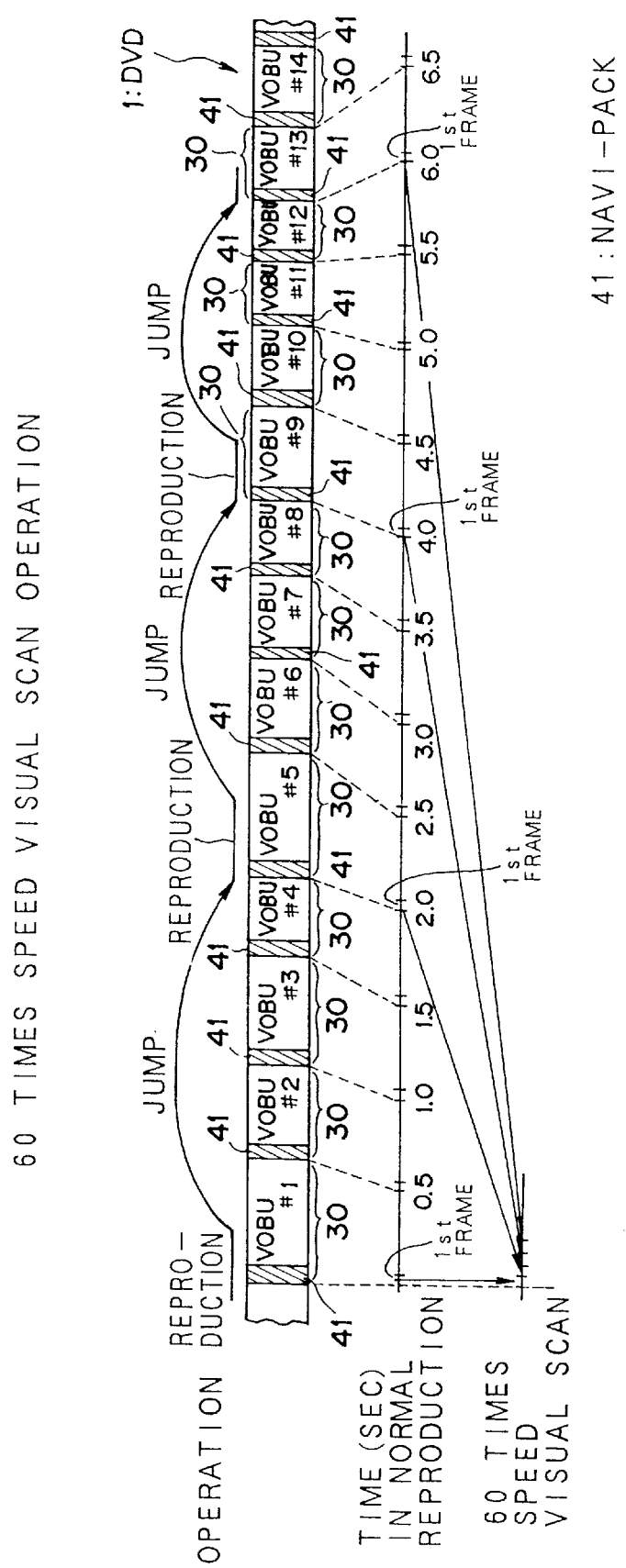
FIG. 13 is a diagram for explaining a 60 times speed scan operation according to the embodiment.

As shown in FIG. 13, in the 60 times speed visual scan, only the first frame video image contained in the VOB unit 30 of every 2 seconds in the normal reproduction is continuously reproduced from the location of the navi-pack 41 corresponding to the currently reproduced data. In the MPEG2 method of the present embodiment, it is prescribed that the number of the frame images reproduced in 1 second is thirty (30) frames. Thus, since one frame every sixty frames is reproduced, the total reproduction time becomes 1/60 of the normal reproduction, which means the reproduction speed becomes sixty times as fast as the normal reproduction speed.

Next, a concrete operation of the 60 times speed visual scan operation is explained with reference to a flowchart of FIG. 14.

Figure 14:
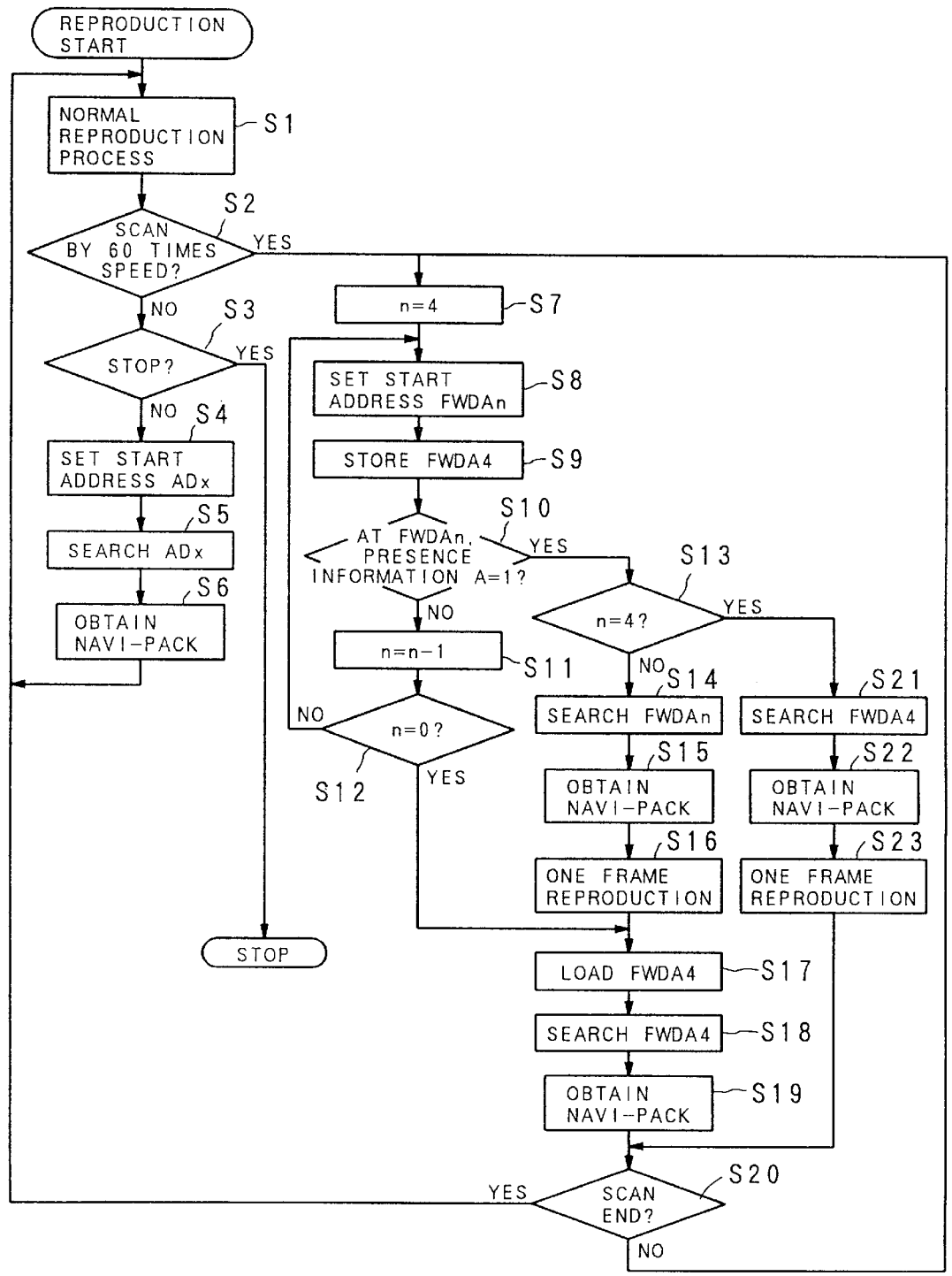
FIG. 14 is a flowchart showing the 60 times speed scan operation according to the embodiment.

As shown in FIG. 14, initially, the normal reproduction process is carried out (step S1). During this normal reproduction process, it is judged whether or not the input signal Sin to instruct the 60 times speed visual scan operation is inputted through the input unit 98 (step S2).

By the judgment at the step S2, if no input signal Sin to instruct the 60 times speed visual scan is inputted (step S2; NO), it is judged whether or not there is an instruction of reproduction stop from the input unit 98 (step S3). If there is the instruction of reproduction stop (step S3; YES), the process is finished as it is. If there is no instruction of reproduction stop (step S3; NO), the start address of the VOB unit 30 for the next reproduction is detected from the VOB unit address A of the VOB unit search information, and the address ADX is set (step S4). The pickup 80 is moved to search the address ADX (step S5), and the navi-pack 41 of the next VOB unit 30 is obtained (step S6). Then, the flow returns to the normal reproduction process.

On the other hand, if there is the input signal Sin to instruct the 60 times speed visual scan at the step S2 (step S2; YES), the parameter n, which indicates the address number of the VOB unit search information (refer to FIG. 10, where the address number is twice of the corresponding reproduction time, respectively), is set to "4" in order to search the VOB unit 30 of after 2 seconds (step S7). After that, "FWDAn" indicating the start address of the VOB unit 30 which will be reproduced after (0.5×n) seconds is set by referencing to the VOB unit address A of the VOB unit search information (step S8). Then, the address ("13" in the example of FIG. 10) corresponding to "FWDA4" corresponding to the current value of n is temporarily stored (step S9).

Then, the presence information A corresponding to the value of "FWDAn" set at the step S8 is detected, and it is judged whether or not the detected value is "1", that is, whether or not the video data 42 exists within the VOB unit 30 corresponding to that "FWDAn" (step S10).

If the video data 42 does not exist within the VOB unit 30 corresponding to the "FWDAn" (step S10; NO), the previous VOB unit 30 (earlier on the time axis) one unit before the VOB unit 30 of "FWDAn" is searched, and the n value is decremented by one in order to detect the VOB unit 30 having the video data 42 (step S11). If the value n is not "0" (step S12; NO), the flow returns to the step S8 to carry out the processes on and after the step S8 with the decremented n value.

On the other hand, if the value n is "0" at the step S12 (step S12; YES), the address corresponding to "FWDA4" (temporarily stored in the step S9) is read out (step S17). The pickup 80 is moved so as to search this address (step S18). Then, the navi-pack 41 of the VOB unit at that recording position is obtained (step S19).

Here, the case where the value n becomes "0" at the step S12 is explained in more detail. Assuming that the value n is set to "4" (FWDA4), for example, when the video data 42 which is to be displayed 2 seconds after is already being displayed as a still picture, by checking the presence information A corresponding to "FWDA4", it is judged that no video data 42 exists at the row of "FWDA4" (see FIG. 10). Accordingly, the value n is decremented by "1" to be "3", and the presence information A corresponding to "FWDA3" is checked. Since no video data 42 exists there (FIG. 10), the value n is further decremented by one. By repeating this processes, if it reaches "FWDA1", and if the presence information A corresponding to "FWDA1" indicates that no video data 42 exists there, the value n becomes "0". When the system controller 100 recognizes this fact, it determines to keep reproducing the video data 42, which is being displayed, as a still picture as it is. The system controller 100 also obtains the navi-pack 41 of the VOB unit 30 corresponding to "FWDA1", and executes the operation written therein.

On the other hand, if the video data 42 exists within the VOB unit 30 corresponding to "FWDAn" at the step S10 (step S10; YES), then it is determined whether or not the value n is "4", which was initially set at the step S7 (step S13). This is because the value of n may differ from "4" by the operations of steps S8 through S12.

If the value n is not "4" at the step S13 (step 13; NO), it is assumed that the video data 42 is recorded at the recording position of the VOB unit 30 indicated by "FWDAn" having the decremented n value obtained at the step S11. Therefore, the pickup 80 is moved to search for the address corresponding to "FWDAn" (step S14). Then, the navi-pack 41 of the VOB unit 30 at that recording position is obtained (step S15). Then, only one frame image corresponding to 0.5×n seconds within the VOB unit 30 corresponding to the obtained navi-pack 41 is reproduced (step S16). After that, the above explained steps S17 through S19 are executed. It is judged whether or not the 60 times speed visual scan is to be ended on the basis of the input signal Sin from the input unit 98 (step S20). If the scan operation is to be ended (step S20; YES), the flow returns to the step S1 to carry out the normal reproduction process. If the scan is not to be ended (step S20, NO), the flow returns to the step S7 and repeats the subsequent processes.

On the other hand, if the value n is "4" at the step S13 (step S13: YES), it is assumed that the video data 42 is contained in the VOB unit 30 corresponding to "FWDA4" having the value n of "4". Thus, the pickup 80 is moved to search for the address for "FWDA4" (step S21). Then the navi-pack 41 of the VOB unit 30 at that recording position is obtained (step S22), and one frame image corresponding to 2 seconds within the VOB unit 30 corresponding to the obtained navi-pack 41 is reproduced (step S23). Then, the step S20 is carried out to judge whether or not the 60 times speed visual scan is to be ended.

By the processes explained above, the 60 times speed visual scan operation is executed by use of the presence information A within the VOB unit search information, such that only one frame picture every 2 seconds is reproduced.

(B) Embodiment of Time Search

Next, a time search operation (i.e., search based on time or, more concretely, an operation to output a picture of a specified time) by use of the presence informations A and B is explained with reference to FIGS. 15 to 17.

Figure 15:
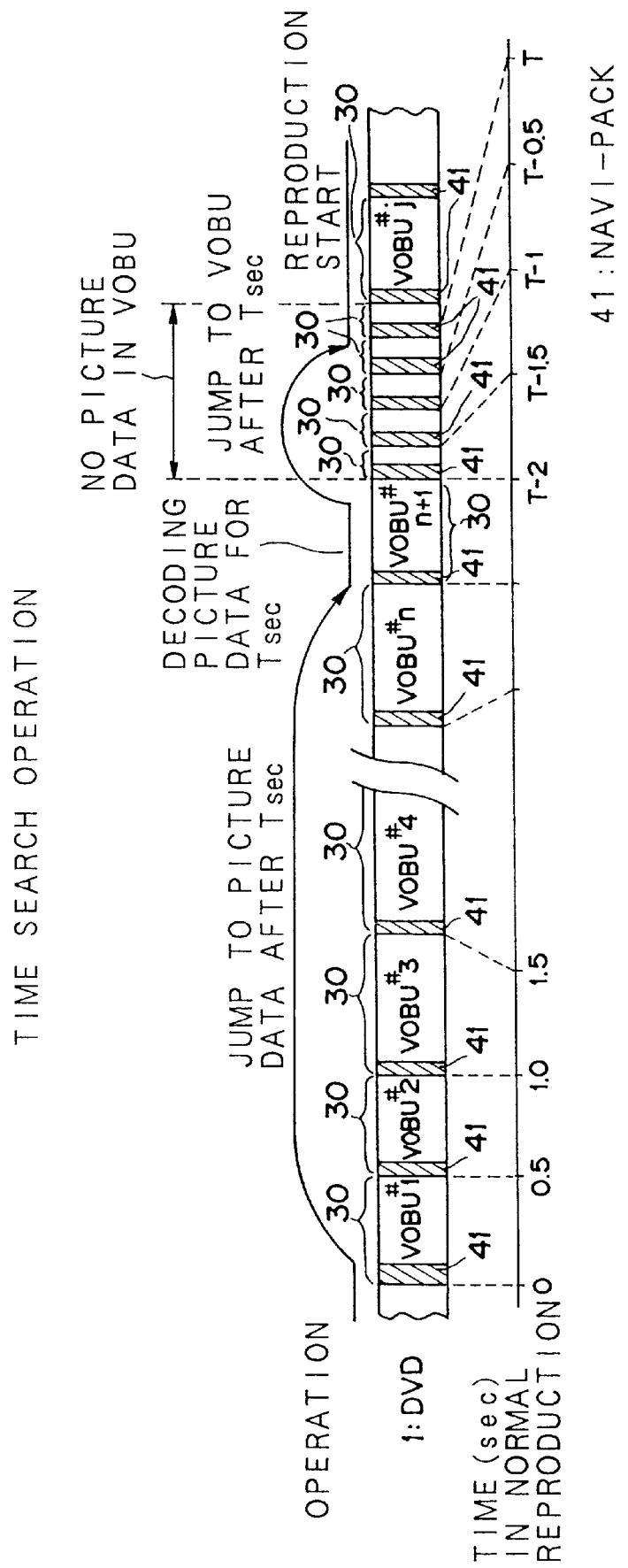
FIG. 15 is a diagram for explaining a time search operation according to the embodiment.

At first, the outline of the time search operation is explained, by use of FIG. 15.

As shown in FIG. 15, in the time search by use of the presence information B, the VOB unit 30 including the video data 42 to be reproduced T seconds after the navi-pack 41A, which is being currently reproduced, is searched when a series of VOB units 30 containing no video data 42 continue on the DVD 1 (it is assumed that a series of VOB units 30 containing no video data 42 are partially included at the position on the DVD 1 corresponding to T seconds after). Then, the VOB units 30 containing no video data 42 are skipped to be read. Then, the audio data 43 to be reproduced at T seconds after etc., other than the video data 42, is searched, so that both of these video and audio informations are reproduced.

Next, a concrete processes to perform the time search operation by use of the presence information B is explained with reference to flowcharts in FIGS. 16 and 17.

Figure 16:
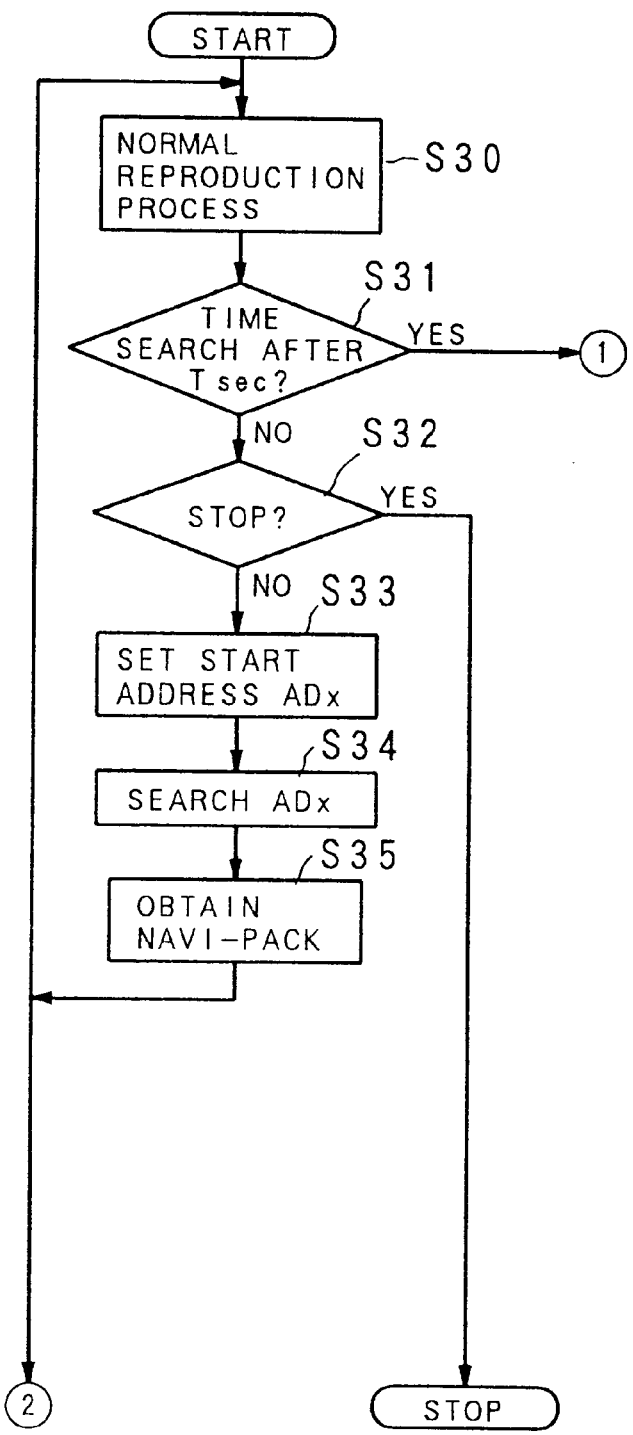
FIG. 16 is a flowchart (1) showing a time search operation according to the embodiment.

As shown in FIGS. 16 and 17, in the time search operation, the normal reproduction process is initially carried out (step S30). During this normal reproduction process, it is judged whether or not the input signal Sin to instruct the time search operation so as to reproduce the video images and audio sounds T seconds after the present is inputted through the input 98 (step S31).

If the input signal Sin to instruct the time search operation is not inputted at the step S31 (step S31: NO), it is judged whether or not an instruction of reproduction stop is inputted through the input unit 98 (step S32). If the instruction of reproduction stop is inputted (step S32; YES), the operation is stopped as it is. If the instruction of reproduction stop is not inputted (step S32; NO), the starting address of the VOB unit 30 to be nextly reproduced is detected from the VOB unit address A of the VOB unit search information to thereby set the start address ADX (step S33). Then, the pickup 80 is moved to search for the address ADX (step S34). Then, the navi-pack 41 of the VOB unit to be nextly reproduced is obtained (step S35), and the flow returns to the normal reproduction process On the other hand, at the step S31, if the input signal Sin to instruct the time search operation is inputted (step S31; YES), a flow branches to a step S36 in FIG. 17.

Then, a start address "FWDAy" of the VOB unit 30 corresponding to T seconds after is obtained and stored (step S36). Then, it is judged whether or not the value of "T×2" (i.e., the address number, see FIG. 10) is equal to or less than 15 (step S37).

If the value of "T×2" is equal to or less than 15 at the step S37 (step S37; YES), the parameter n indicating the address number is set to "T×2" (step S38). After that, "FWDAn" indicating the start address of the VOB unit 30 which is to be reproduced (0.5×n) seconds after is set, by referring to the VOB unit address A of the VOB unit search information (step S39). Then, the presence information A corresponding the value of "FWDAn" set at the step S39 is detected, and it is judged whether or not the value of "FWDAn" is equal to "1". Namely, it is judged whether or not the video data 42 exists within the VOB unit 30 corresponding to "FWDAn" (step S40).

If the video data 42 does not exist within the VOB unit 30 corresponding to "FWDAn" at the step S40 (step S40; NO), the value of n is decremented by one, so as to search the VOB unit 30 recorded with the video data 42 by searching the VOB unit 30 before (i.e., earlier in time sequence) the VOB unit 30 corresponding the "FWDAn" (step S41). Then, it is judged whether or not the value n is equal to "0" (step S42). If the value n is not "0" (step S42; NO), the flow returns to the step S39 to carry out the steps of and following S39 using the decremented value n.

On the other hand, if the value n is "0" at the step S42 (step S42; YES), it has the same meaning as the case where the value n is "0" in the step S12 of FIG. 14 (as aforementioned). That is, it has the meaning that the VOB unit 30 containing the video data 42 does not exist on the DVD 1 corresponding the time period from the time at inputting the input signal Sin to instruct the time search operation to T seconds after that time. Therefore, the last one frame included in the VOB unit 30 which was being reproduced at the time of inputting the input signal Sin to instruct the time search becomes the picture to be reproduced T seconds after. Thus, the frame picture corresponding to the VOB unit 30, which was being reproduced at the input timing of the input signal Sin to instruct the time search, is reproduced (step S43). Then, the start address "FWDAy" of the VOB unit 30 (which includes the audio data 43 to be reproduced T seconds after etc., besides the video data 42) corresponding to T seconds after, which was stored at the step S35, is read out, and the pickup 80 is moved so as to search this address (step S44). Then, the navi-pack 41 of the VOB unit 30 at that recording position is obtained (step S45). Then, a flow returns to the step S30 in FIG. 16, where the normal reproduction process is carried out (step S30).

In FIG. 17, at the step S40, if the video data 42 exists within the VOB unit 30 corresponding to "FWDAn" at the step S40 (step S40; YES), the start address of the VOB unit 30 corresponding to "FWDAn" is reset as a start address "FWDAx" (step S46).

Then, it is judged whether or not the start address "FWDAx" of the VOB unit 30 is equal to the start address "FWDAy" of the VOB unit 30 set in the step S36 (step S47). When they are equal (step S47; YES), the VOB unit 30 having the address "FWDAx" is the target VOB unit 30 which is to be reproduced T seconds after the input timing and which includes the video data 42. If this is the case, the steps S44 and S45 are carried out, and the flow returns to the normal reproduction process (step S30) in FIG. 16.

In FIG. 17, at the step S47, if the start address "FWDAx" of the VOB unit 30 is not equal to the start address "FWDAy" of the VOB unit 30 (step S47; NO), the video data 42, which is to be reproduced T seconds after the input timing, is included in the VOB unit 30 having the address "FWDAx", which is recorded before (i.e., earlier in time sequence) the VOB unit 30 of "FWDAy" on the DVD1. Accordingly, the start address "FWDAx" is read, and the pickup 80 is moved to search this address (step S48). Then, the navi-pack 41 of the VOB unit 30 at that recording position is obtained (step S49). Then, the video data 42 included in this VOB unit 30 (which is to be reproduced T seconds after) is reproduced (step S50). After that, the processes at the steps S44 and S45 are carried out, and the flow returns to the normal reproduction process (step S30) in FIG. 16.

In FIG. 17, at the step S37, if the value of "T×2" is greater than 15 (step S37; NO), it is judged whether or not the value of "T×2" is within the rage greater than 15 and less than or equal to 20 (i.e., 15<T×2≦20) (step S51).

If the value of "T×2" is greater than 15 and less than or equal to 20 (step S51; YES), the start address "FWDA20" of the VOB unit 30 is obtained and stored (step S52). Then, it is judged whether or not the value of "T×2" is equal to "20" and the presence information A of the address "FWDA20" is equal to "1" (step S53).

At the step S53, if the value of "T×2" is equal to "20" and the presence information A is equal to "1" (step S53; YES), it means that the video picture and the audio sound to be searched is those of 10 seconds after, and that the video data 42 is recorded in the VOB unit 30 which is to be reproduced 10 seconds after. Therefore, the flow branches to the step S44 so as to begin the reproduction from the VOB unit 30 corresponding to "FWDA20".

On the other hand, At the step S53, if the value of "T×2" is not equal to "20" or the presence information A of the address "FWDA20" is not equal to "1" (step S53; NO), it means that the video data 42 is not recorded in the VOB unit 30 corresponding to "FWDA20". Therefore, it is judged whether or not the presence information B of "FWDA20" is equal to "1", in order to check whether or not there is a VOB unit 30 which has the video data 42 and which exists between the VOB unit 30 at the address "FWDA20" and the VOB unit 30 at the address "FWDA15 (step S54). If the presence information B of "FWDA20" is not "1" (step S54; NO), it means that no VOB unit 30 having the video data 42 exists between the VOB unit 30 next to the VOB unit 30 of "FWDA15" and the VOB unit 30 just before the VOB unit 30 of "FWDA20". Thus, the parameter n (indicating the address number) is set to "15" in order to search the VOB unit 30 having the video data 42 within the range of the address number equal to or less than 15 (step S55), and the flow branches to the step S39. After that, the VOB unit 30 having the video data 42 is searched on the basis of the presence information A. The picture is reproduced from the searched VOB unit 30 (steps S39 to S50).

On the other hand, at the step S54, if the presence information B of "FWDA20" is equal to "1" (step S54; YES), it means that the VOB unit 30 having the video data 42 exists between the VOB unit 30 next to the VOB unit 30 of "FWDA15" and the VOB unit 30 just before the VOB unit 30 of "FWDA20". Thus, in order to search the VOB unit 30 having the video data 42, the VOB unit 30 corresponding to "FWDA15" is searched (step S56). Then, the navi-pack 41 of the VOB unit 30 corresponding to the "FWDA15" is obtained (step S57). Then, on the basis of the presence information A and the VOB unit address A within the VOB unit search information (see FIG. 10) recorded in the obtained navi-pack 41, the start address of the VOB unit 30 having the video data 42 to be reproduced T seconds after is searched between the VOB unit 30 of "FWDA15" and the VOB unit 30 of "FWDA20". This searched start address is set to "FWDAx" (step S58). After that, the aforementioned steps S47 to S50, and steps S44 and S45 are carried out. Namely, the video data 42 to be reproduced T seconds after is reproduced (step S50). Then data recorded in the VOB unit 30 to be reproduced at T seconds after is read out (steps S44 and S45), and the normal reproduction process is carried out from that point of time (step S30) in FIG. 16.

On the other hand, at the step S51 in FIG. 17, if the value of "T×2" does not satisfy the range greater than 15 and less than or equal to 20 (step S51; NO), it is judged whether or not the value of "T×2" is greater than 20 and less than or equal to "60" (step S59).

If the value of "T×2" is greater than 20 and less than or equal to 60 (step S59; YES), the start address of the VOB unit 30 corresponding to "FWDA60" is obtained and stored (step S60). Then, it is judged whether or not the value of "T×2" is equal to "60" and the presence information A of "FWDA60" is equal to "1" (step S61).

At the step S61, if the value of "T×2" is equal to "60" and the presence information A corresponding "FWDA60" is equal to "1" (step S61; YES), it means that the video picture and the audio sound to be time-searched are the video picture and the audio sound of 30 seconds after, and that there is the video data 42 recorded in the VOB unit 30 to be reproduced at 30 seconds after. Thus, the flow branches to the step S44 to begin the reproduction from this VOB unit 30 (corresponding to "FWDA60").

At the step S61, if the value of "T×2" is not equal to "60" or the presence information A corresponding "FWDA60" is not equal to "1" (step S61; NO), it means that the video data 42 is not recorded in the VOB unit 30 corresponding "FWDA60". Thus, it is judged whether or not the presence information B of "FWDA60" is equal to "1" in order to judge whether or not there is a VOB unit 30 which has the video data 42 and which exists between the VOB unit 30 corresponding "FWDA60" and the VOB unit 30 corresponding "FWDA20" (step S62). Then, if the presence information B corresponding "FWDA60" is not equal to "1" (step S62; NO), it means that no VOB unit 30 having the video data 42 exists between the VOB unit 30 next to the VOB unit 30 of "FWDA20" and the VOB unit 30 just before the VOB unit 30 of "FWDA60". Thus, the flow branches to the step S52, so as to search the VOB unit 30 having the video data 42 within the range of the address number less than or equal to 20.

On the other hand, at the step S62, if the presence information B corresponding to "FWDA60" is equal to "1" (step S62; YES), it means that the VOB unit 30 having the video data 42 exists between the VOB unit 30 next to the VOB unit 30 of "FWDA20" and the VOB unit 30 just before the VOB unit 30 of "FWDA60". Accordingly, the VOB unit 30 corresponding to "FWDA20" is searched so as to search the VOB unit 30 recorded with the video data 42 (step S63). Then, the navi-pack 41 of this VOB unit 30 corresponding to "FWDA20" is obtained (step S64). Then, on the basis of the VOB unit address A, the presence information A and the presence information B within the VOB unit search information (see FIG. 10) recorded in the obtained navi-pack 41, the start address of the VOB unit 30, which includes the video data 42 to be reproduced at T seconds after, is searched between the VOB unit 30 of "FWDA20" and the VOB unit 30 of "FWDA60", and this searched address is set to "FWDAx" (step S65). After that, the aforementioned steps S47 to S50, and steps S44, S45 are carried out. Namely, the video data 42 to be reproduced T seconds after is reproduced (step S50), the data recorded in the VOB unit 30 to be reproduced T seconds after is read(steps S44 and S45), and the normal reproduction process is carried out from that point of time (step S30) in FIG. 16.

In FIG. 17, at the step S59, if the value of "T×2" does not satisfy the range greater than 20 and less than or equal to 60 (step S59; NO), it is judged whether or not the value of "T×2" is greater than 60 and less than or equal to 120 (step S66).

If the value of "T×2" is greater than 60 and less than or equal to 120 (step S66; YES), the start address of the VOB unit 30 corresponding to "FWDA120" is obtained and stored (step S67). Then, it is judged whether or not the value of "T×2" is equal to "120" and the presence information A of "FWDA120" is equal to "1" (step S68).

At the step S68, if the value of "T×2" is equal to "120" and the presence information A corresponding to "FWDA120" is equal to "1" (step S68; YES), it means that the video picture and audio sound to be time-searched is the video picture and audio sound of 60 seconds after, and that the video data 42 is recorded in the VOB unit 30 which is to be reproduced 60 seconds after. Thus, the flow branches to the step S44 to begin the reproduction from the VOB unit 30 corresponding "FWDA120".

On the other hand, at the step S68, if the value of "T×2" is not equal to "120" or the presence information A corresponding to "FWDA120" is not equal to "1" (step S68; NO), it means that the video data 42 is not recorded in the VOB unit 30 of "FWDA120". Thus, it is judged whether or not the presence information B of "FWDA120" is equal to "1", in order to judge whether or not the VOB unit 30 having the video data 42 exists between the VOB unit 30 corresponding to "FWDA120" and the VOB unit 30 corresponding to "FWDA60" (step S69). If the presence information B corresponding "FWDA120" is not equal to "1" (step S69; NO), it means that no VOB unit 30 having video data 42 exists between the VOB unit 30 next to the VOB unit 30 of "FWDA60" and the VOB unit 30 just before the VOB unit 30 of "FWDA120". Thus, the flow branches to the step S60, so as to search the VOB unit 30 having the video data 42 within the range of address numbers less than 60, At the step S69, if the presence information B corresponding "FWDA120" is equal to "1" (step S69; YES), it means that the VOB unit 30 having the video data 42 exists between the VOB unit 30 next to the VOB unit 30 of "FWDA60" and the VOB unit 30 just before the VOB unit 30 of "FWDA120". Thus, the VOB unit 30 corresponding to "FWDA60" is searched, so as to search the VOB unit 30 recorded with the video data 42 (step S70). Then, the navi-pack 41 of the VOB unit 30 corresponding to "FWDA60" is obtained (step S71). Then, on the basis of the VOB unit address A, the presence information A and the presence information B within the VOB unit search information recorded in the obtained navi-pack 41 (see FIG. 10), the start address of the VOB unit 30 including the video data 42 to be reproduced T seconds after is searched between the VOB unit 30 of "FWDA60" and the VOB unit 30 of "FWDA120". This searched address is set to "FWDAx" (step S72). After that, the aforementioned steps S47 to S50, and steps S44 and S45 are carried out. Namely, the video data 42 to be reproduced at T seconds after is reproduced (step S50), and the data recorded in the VOB unit 30 to be reproduced at T seconds after is read out (steps S44 and S45), and the normal reproduction process is carried out from that point of time (step S30) in FIG. 16.

On the other hand, at the step S66, if the value of "T×2" does not satisfy the range greater than 60 and less than or equal to 120 (step S66; NO), it is judged whether or not the value of "T×2" is greater than 120 and less than or equal to 240 (step S73).

If the value of "T×2" is greater than 120 and less than or equal to 240 (step S73; YES), the start address of the VOB unit 30 corresponding to "FWDA240" is obtained and stored (step S74). Then, it is judged whether or not the value of "T×2" is equal to "240" and the presence information A corresponding to "FWDA240" is equal to "1" (step S75).

At the step S75, if the value of "T×2" is equal to "240" and the presence information A corresponding to "FWDA240" is equal to "1" (step S75; YES), it means that the video picture and audio sound to be time-searched are the video picture and audio sound to be reproduced at 120 seconds after, and that the video data 42 is recorded in the VOB unit 30 to be reproduced at 120 seconds after. Thus, the flow branches to the step S44 to begin the reproduction from the VOB unit 30 corresponding to "FWDA240".

On the other hand, at the step S75, if the value of "T×2" is not equal to "240" or the existing information A corresponding to "FWDA240" is not equal to "1" (step S75; NO), the video data 42 is not recorded in the VOB unit 30 corresponding to "FWDA240". Thus, it is judged whether or not the presence information B of "FWDA240" is equal to "1", so as to judge whether or not the VOB unit 30 having the video data 42 exists between the VOB unit 30 of "FWDA240" and the VOB unit 30 of "FWDA120" (step S76). If the presence information B corresponding to "FWDA240" is not equal to "1" (step S76; NO), it means that no VOB unit 30 having the video data 42 exists between the VOB unit 30 next to the VOB unit 30 of "FWDA120" and the VOB unit just before the VOB unit 30 of "FWDA240". Thus, the flow branches to the step S67, so as to search the VOB unit 30 having video data 42 within the range of the address number less than 120.

On the other hand, at the step S76, if the presence information B corresponding to "FWDA240" is equal to "1" (step S76; YES), it means that the VOB unit 30 having the video data 42 exists between the VOB unit 30 next to the VOB unit 30 of "FWDA120" and the VOB unit 30 just before the VOB unit 30 of "FWDA240". Thus, the VOB unit 30 corresponding to "FWDA120" is searched, so as to obtain the VOB unit 30 recorded with the video data 42 (step S77). Then, the navi-pack 41 of the VOB unit 30 corresponding to "FWDA120" is obtained (step S78). On the basis of the VOB unit address A, the presence information A and the presence information B within the VOB unit search information (see FIG. 10) recorded in the navi-pack 41, the start address of the VOB unit 30 including the video data 42 to be reproduced T seconds after is searched between the VOB unit 30 of "FWDA120" and the VOB unit 30 of "FWDA240". This searched address is set to "FWDAx" (step S79). After that, the aforementioned steps S47 to S50, and steps S44 and S45 are carried out. Namely, the video data 42 to be reproduced T seconds after is reproduced (step S50), the data recorded within the VOB unit 30 to be reproduced T seconds after is read out (steps S44 and S45), and the normal reproduction process is carried out from that point of time (step S30) in FIG. 16.

In FIG. 17, at the step S73, if the value of "T×2" does not satisfy the range greater than 120 and less than or equal to 240 (step S73; NO), it means that the value of "T×2" is greater than 240. Thus, if this is the case, the time search cannot be carried out by use of the VOB unit search information shown in FIG. 10. Accordingly, a different time search process is carried out by use of a time search map, in which the start addresses of the VOB units 30 are written, each including the video data 42 to be reproduced at each reproduction time over a broader range of the reproduction time (step S80).

According to the operations shown in FIGS. 16 and 17 explained above, the time search operation is executed by use of the presence informations A and B within the VOB unit search information.

As has been explained above, the reproducing apparatus SS2 can promptly search and reproduce the target video data 42 which is to be reproduced, since the presence informations A and B are recorded within the VOB unit search information.

Moreover, even in a case where the video data 42 corresponding to moving pictures and still pictures is recorded on the DVD 1 and where a plurality of VOB units 30 which do not contain the video data exist, it is possible to speedily search and reproduce the moving pictures or still pictures which are to be nextly reproduced, and to perform the reproduction of the video data 42 without cutting or interrupting it.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An information reproducing apparatus for reproducing record information from an information record medium comprising a data structure stored in said information record medium and including: processed record information, which is generated by applying a predetermined signal process to said record information including video information and other information to be recorded, and which is composed of a plurality of predetermined information units; first recording position information, which indicates recording positions on said information record medium of said information units corresponding to reproduction times of said record information within a predetermined range before and after said respective one of said information units on an axis of reproduction time of said record information; and second recording position information, which corresponds to said first recording position information and indicates recording positions of said video information to be reproduced within the predetermined range on the axis of reproduction time, said processed record information, said first recording position information and said second recording position information being multiplexed by respective one of said information units, said plurality of information units including a first portion that is commonly owned by a plurality of programs and a second portion that is not commonly owned by the plurality of programs, said second portion constituting an interleaved part in which some of said plurality of information units belonging to the plurality of programs are interleaved and recorded so as to perform a seamless reproduction of each of said plurality of programs, said information reproducing apparatus comprising:

a detection and demodulation means for detecting and demodulating said processed record information, said first recording position information and said second recording position information from said information record medium on the basis of a control signal, to thereby output a demodulation signal;

an extract means for extracting said first recording position information and said second recording position information out of said demodulation signal; and a control means for outputting said control signal on the basis of said extracted first recording position information and said extracted second recording position information to control the reproduction of said plurality of information units including said first portion and said second portion.

2. An information reproducing apparatus according to claim 1, wherein:

said video information comprises information corresponding to a moving picture at a time of the reproduction and information corresponding to a still picture at the time of the reproduction; and said detection and demodulation means detects and demodulates said second recording position information, which indicates the recording positions of said information corresponding to said moving picture or the recording positions of said information corresponding to said still picture.

3. An information reproducing apparatus for reproducing record information from an information record medium comprising a data structure stored in said information record medium and including: processed record information, which is generated by applying a predetermined signal process to said record information including video information and other information to be recorded, and which is composed of a plurality of predetermined information units; recording position information, which indicates recording positions on said information record medium of said information units corresponding to reproduction times of said record information within a predetermined range before and after said respective one of said information units on an axis of reproduction time of said record information; and video presence information, which corresponds to said recording position information and indicates presence or absence of said video information at each of said information units whose recording positions are indicated by said record position information, said processed record information, said recording position information and said video presence information being multiplexed by respective one of said information units, said plurality of information units including a first portion that is commonly owned by a plurality of programs and a second portion that is not commonly owned by the plurality of programs, said second portion constituting an interleaved part in which some of said plurality of information units belonging to the plurality of programs are interleaved and recorded so as to perform a seamless reproduction of each of said plurality of programs, said information reproducing apparatus comprising:

- a detection and demodulation means for detecting and demodulating said processed record information, said recording position information and said video presence information from said information record medium on the basis of a control signal, to thereby output a demodulation signal;
- an extract means for extracting said recording position information and said video presence information out of said demodulation signal; and
- a control means for outputting said control signal on the basis of said extracted recording position information and said extracted video presence information to control the reproduction of said plurality of information units including said first portion and said second portion.

4. An information reproducing apparatus according to claim 3, wherein:

- said video information comprises information corresponding to a moving picture at a time of the reproduction and information corresponding to a still picture at the time of the reproduction; and
- said detection and demodulation means detects and demodulates said video presence information, which indicates the presence or absence of said information corresponding to said moving picture or the presence or absence of said information corresponding to said still picture.

5. An article of manufacture comprising:

an information recording medium;

processed record information recorded on the information recording medium, the processed record information being generated by applying a predetermined signal process to record information to be reproduced by an information reproducing apparatus for performing a reproduction of the record information, the processed record information including video information and other information and being composed of a plurality of predetermined information units;

first recording position information recorded on the information recording medium, the first recording position information indicating recording positions on the information record medium of the information units corresponding to reproduction times of the record information within a predetermined range before and after the respective one of the information units on an axis of reproduction time of the record information; and second recording position information recorded on the information recording medium, the second recording position information corresponding to the first recording position information and indicating recording positions of the video information to be reproduced within the predetermined range on the axis of reproduction time, wherein the processed record information, the first recording position information and the second recording position information are multiplexed by respective one of the information units, and the plurality of information units includes a first portion that is commonly owned by a plurality of programs and a second portion that is not commonly owned by the plurality of programs, said second portion constitutes an interleaved part in which some of the plurality of information units belonging to the plurality of programs are interleaved and recorded so as to perform a seamless reproduction of each of said plurality of programs in accordance with the reproduced first portion and second portion of the information units.

6. The article of manufacture according to claim 5, wherein;

- the video information comprises information corresponding to a moving picture at a time of the reproduction and information corresponding to a still picture at the time of the reproduction; and
- the second recording position information indicates the recording positions of the information corresponding to the moving picture or the recording positions of the information corresponding to the still picture.

7. An article of manufacture comprising:

an information recording medium;

processed record information recorded on the information recording medium, the processed record information being generated by applying a predetermined signal process to record information to be reproduced by an information reproducing apparatus for performing a reproduction of the record information, the processed record information including video information and other information and being composed of a plurality of predetermined information units;

recording position information recorded on the information recording medium, the recording position information indicating recording positions on the information record medium of the information units corresponding to reproduction times of the record information within a predetermined range before and after the respective one of the information units on an axis of reproduction time of the record information; and video presence information recorded on the information recording medium, the video presence information corresponding to the recording position information, and indicating presence or absence of the video information at each of the information units whose recording positions are indicated by the record position information, wherein the processed record information, the recording position information and the video presence information are multiplexed by respective one of the information units, and the plurality of information units includes a first portion that is commonly owned by a plurality of programs and a second portion that is not commonly owned by the plurality of programs, said second portion constitutes an interleaved part in which some of the plurality of information units belonging to the plurality of programs are interleaved and recorded so as to perform a seamless reproduction of each of said plurality of programs in accordance with the reproduced first portion and second portion of the information units.

8. The article of manufacture according to claim 7, wherein:

the video information comprises information corresponding to a moving picture at a time of the reproduction and information corresponding to a still picture at the time of the reproduction; and the video presence information indicates the presence or absence of the information corresponding to the moving picture or the presence or absence of the information corresponding to the still picture.

* * * * *